(12) United States Patent
Leingang et al.

(10) Patent No.: US 11,971,870 B2
(45) Date of Patent: *Apr. 30, 2024

(54) GENERATING TABLES USING DATA RECORDS

(71) Applicant: Clover Health, Jersey City, NJ (US)

(72) Inventors: Joey P. Leingang, New York, NY (US); David Ford Flerlage, San Francisco, CA (US)

(73) Assignee: Clover Health, Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/680,703

(22) Filed: Feb. 25, 2022

(65) Prior Publication Data

US 2022/0253422 A1 Aug. 11, 2022

Related U.S. Application Data

(63) Continuation of application No. 16/195,226, filed on Nov. 19, 2018, now Pat. No. 11,263,193.

(51) Int. Cl.
*G06F 16/00* (2019.01)
*G06F 16/21* (2019.01)
*G06F 16/22* (2019.01)

(52) U.S. Cl.
CPC ........ *G06F 16/2282* (2019.01); *G06F 16/219* (2019.01)

(58) Field of Classification Search
CPC ............................ G06F 16/219; G06F 16/2282
See application file for complete search history.

(56) References Cited

U.S. PATENT DOCUMENTS

| 8,433,692 | B2 | 4/2013 | Jain et al. |
| 8,887,148 | B1 * | 11/2014 | Kiaie ....................... G06F 8/65 |
| | | | 717/177 |
| 9,697,239 | B1 * | 7/2017 | Buchholz .............. G06F 16/212 |
| 10,109,027 | B1 * | 10/2018 | Stack .................... G06Q 50/22 |
| 11,263,193 | B2 * | 3/2022 | Leingang .............. G06F 16/219 |
| 2004/0103393 | A1 | 5/2004 | Reddy et al. |
| 2004/0230616 | A1 | 11/2004 | Kruy et al. |

(Continued)

OTHER PUBLICATIONS

Office Action for U.S. Appl. No. 16/195,226, dated Feb. 24, 2021, Leingang, "Generating Tables Using Data Records", 36 Pages.

(Continued)

*Primary Examiner* — Leslie Wong
(74) *Attorney, Agent, or Firm* — Lee & Hayes, P.C.

(57) ABSTRACT

Systems and methods for generating tables using data associated with records. For example, a system may store the data associated with the record in one or more databases. The system may then generate tables associated with fields of the record, where the tables indicate updates and/or changes to the fields. For instance, when changes are made to a field of the record, the system may update the table to indicate the changes, times at which the changes occurred, identifiers of users that made the changes, reasons for the changes, and/or so forth. The system may further update a version of the record when updates and/or changes are made to the fields. Furthermore, the system may update the tables to indicate versions of the record when the updates and/or changes occurred to the fields.

18 Claims, 14 Drawing Sheets

(56) References Cited

U.S. PATENT DOCUMENTS

| | | | |
|---|---|---|---|
| 2005/0033777 A1* | 2/2005 | Moraes | G06F 16/27 |
| 2005/0144198 A1* | 6/2005 | Bergstraesser | G06F 16/289 |
| | | | 707/999.203 |
| 2006/0075000 A1* | 4/2006 | Kleewein | G06F 16/219 |
| | | | 707/999.203 |
| 2007/0067357 A1 | 3/2007 | Clark | |
| 2008/0126146 A1* | 5/2008 | Benveniste | G06Q 30/0242 |
| | | | 705/14.68 |
| 2009/0187610 A1* | 7/2009 | Guo | G06F 16/219 |
| | | | 707/999.203 |
| 2010/0185595 A1* | 7/2010 | Gopalakrishnan | G06F 16/219 |
| | | | 707/E17.017 |
| 2011/0246546 A1 | 10/2011 | Hughes et al. | |
| 2012/0030258 A1* | 2/2012 | Jain | G06F 16/219 |
| | | | 707/812 |
| 2012/0191682 A1 | 7/2012 | Banerjee et al. | |
| 2012/0310934 A1 | 12/2012 | Peh et al. | |
| 2014/0180711 A1* | 6/2014 | Kamen | G06Q 10/10 |
| | | | 705/2 |
| 2015/0370844 A1* | 12/2015 | Chen | G06F 16/2365 |
| | | | 707/634 |
| 2015/0379061 A1 | 12/2015 | Paraschivescu | |
| 2015/0379065 A1* | 12/2015 | Yoshizawa | G06F 16/2365 |
| | | | 707/689 |
| 2016/0055197 A1* | 2/2016 | Caro | G06F 16/2365 |
| | | | 707/695 |
| 2016/0283890 A1* | 9/2016 | Diehl | G06F 16/24575 |
| 2017/0139725 A1* | 5/2017 | Koufogiannakis | |
| | | | G06F 9/44505 |
| 2019/0377723 A1* | 12/2019 | Caro | G06F 16/219 |
| 2020/0159843 A1 | 5/2020 | Leingang et al. | |

OTHER PUBLICATIONS

Office Action for U.S. Appl. No. 16/195,226, dated Jun. 16, 2021, Leingang, "Generating Tables Using Data Records", 22 Pages.

Non Final Office Action dated Sep. 17, 2020 for U.S. Appl. No. 16/195,226, "Generating Tables Using Data Records", Leingang, 26 pages.

The PCT Search Report and Written Opinion dated Feb. 3, 2020 for PCT Application No. PCT/US19/62118, 9 pages.

* cited by examiner

308

| Time | Identifier | Information | Reason | Version |
|---|---|---|---|---|
| June 12 11:00 | John | Call Time – 10:00 | | 1-2 |
| June 18 2:00 | Eric | Call Time – 10:05 | Wrong Time Listed | 2-4 |
| June 25 4:00 | Aaron | Call Time – 10:10 | Wrong Time Listed | 4-∞ |

310

| Time | Identifier | Information | Reason | Version |
|---|---|---|---|---|
| June 12 11:00 | John | Call Length – 4 Minutes | | 1-3 |
| June 19 3:00 | Eric | Call Length – 5 Minutes | Wrong Time Listed | 3-5 |
| June 28 5:00 | Aaorn | Call Length – 6 Minutes | Wrong Time Listed | 5-∞ |

312

| Time | Identifier | Information | Reason | Version |
|---|---|---|---|---|
| June 12 11:00 | John | Call Time – 10:00 | | 1 |
| June 12 11:00 | John | Call Length – 4 Minutes | | 1 |
| June 18 2:00 | Eric | Call Time – 10:05 | Wrong Time Listed | 2 |
| June 19 3:00 | Eric | Call Length – 5 Minutes | Wrong Time Listed | 3 |
| June 25 4:00 | Aaron | Call Time – 10:00 | Wrong Time Listed | 4 |
| June 28 5:00 | Aaron | Call Length – 6 Minutes | Wrong Time Listed | 5 |

FIG. 3B

USER INTERFACE 402

PORTION 408

410(1)

| TIME | IDENTIFIER | INFORMATION | REASON | VERSION |
|---|---|---|---|---|
| JUNE 12 11:00 | JOHN | CALL TIME – 10:00 | | 1-2 |
| JUNE 18 2:00 | ERIC | CALL TIME – 10:05 | WRONG TIME LISTED | 2-4 |
| JUNE 25 4:00 | AARON | CALL TIME – 10:10 | WRONG TIME LISTED | 4-∞ |

410(2)

| TIME | IDENTIFIER | INFORMATION | REASON | VERSION |
|---|---|---|---|---|
| JUNE 12 11:00 | JOHN | CALL LENGTH – 4 MINUTES | | 1-3 |
| JUNE 19 3:00 | ERIC | CALL LENGTH – 5 MINUTES | WRONG TIME LISTED | 3-5 |
| JUNE 28 5:00 | AAORN | CALL LENGTH – 6 MINUTES | WRONG TIME LISTED | 5-∞ |

PORTION 404

406

412(2)

| DATE | USER | CALL TIME | RECIPIENT |
|---|---|---|---|
| JUNE 12 10:10 | JOHN | 6 MINUTES | BUSINESS 1 |
| JUNE 14 3:00 | ERIC | 4 MINUTES | BUSINESS 2 |
| JUNE 19 10:00 | JOHN | 1 MINUTES | BUSINESS 3 |
| JUNE 22 12:00 | JOHN | 2 MINUTES | BUSINESS 4 |
| JUNE 25 8:00 | ERIC | 4 MINUTES | BUSINESS 5 |
| JUNE 28 10:00 | JOHN | 7 MINUTES | BUSINESS 6 |

GENERATING TABLES USING DATA RECORDS

CROSS-REFERENCE TO RELATED APPLICATION

This patent application is a continuation of and claims priority to U.S. patent application Ser. No. 16/195,226, filed Nov. 19, 2018, which is fully incorporated herein by reference.

BACKGROUND

When creating a record, data associated with the record may be stored in a database. The data may then be updated and/or changed over a period of time as new information is received and inputted into the record. For example, if a record is being created for a patient, data associated with the record may be stored in a database. The data may represent information, such as the name of the patient, the birthdate of the patient, the reason for the patient's visit, tests performed on the patient, results of the tests, a contact log associated with the patient, and so forth. In some situations, such as when there is a mistake with the information inputted into the record, the information may be updated and/or changed. Tracking these updates and/or changes to the record may be important.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3B illustrates an example of generating a history table for the record of FIG. 3A, according to various examples of the present disclosure.

FIG. 4 illustrates an example user interface that may be utilized to search through history tables in order to identify changes that occurred with a record, according to various examples of the present disclosure.

DETAILED DESCRIPTION

Figure 1:
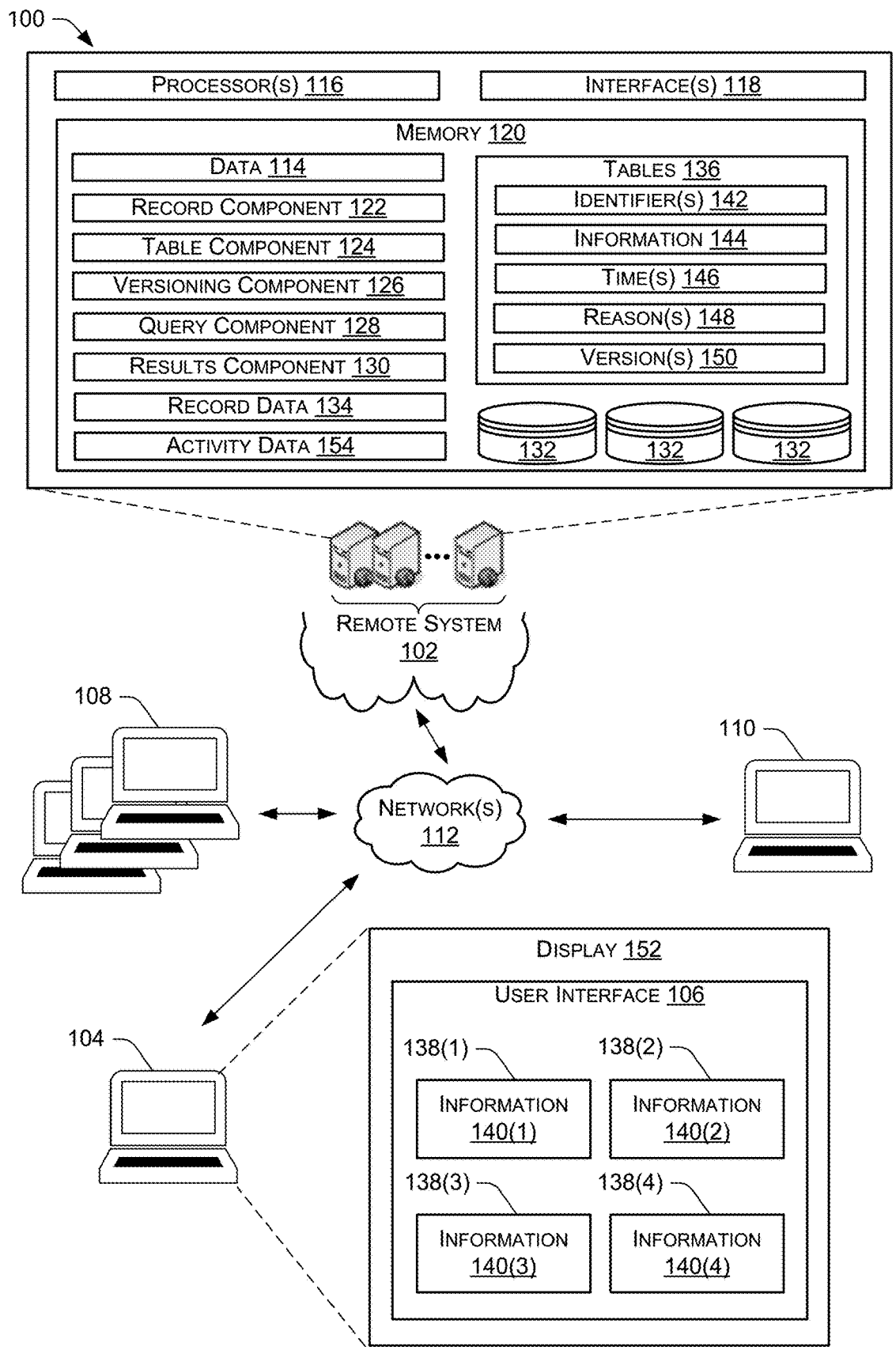
FIG. 1 illustrates a schematic diagram of an example environment for generating tables using data records, according to various examples of the present disclosure.

Systems and methods for generating tables using data associated with records. For example, an entity, such as a user, group, business, corporation, and/or so forth, can generate a record of an event. To generate the record, electronic device(s) can receive inputs indicating information to input into the record. A system can then receive, from the electronic device(s), indications of the information input into the record. Using the indications, the system can generate and/or store data in one or more databases. The data can represent the information that is input into the record. Additionally, over a period of time, the electronic device(s) can receive inputs indicating updates and/or changes to the information included within the record. The system can then receive, from the electronic device(s), indications of the updates and/or changes to the information. Based at least in part on the indications, the system can update the data stored in the one or more database such that the data represents the updated and/or changed information.

In some examples, the record can include fields (e.g., properties, fields, elements, etc.), where a field can be updated with information that is relevant to the field. For example, if the record is associated with a patient, the record can include a first field associated with a name of the patient, a second field associated with a birthdate of the patient, a third field associated with the reason for the patient's visit, a fourth field associated with tests performed on the patient, a fifth field associated with results of the tests, a sixth field associated with a contact log, and/or so forth. In some examples, information that is relevant to one or more of the fields cannot be updated. For example, the first field associated with the name of the patient may not be updated once the information relevant to the first field (e.g., the name) is input into the record. Additionally, or alternatively, in some examples, information that is relevant to one or more of the fields can be updated.

In some examples, the system can receive, from the electronic device(s), indications of fields that are included within the record. The system can then generate, for one or more of the fields, a respective history table for each of the one or more fields. The history table for a field can be updated to indicate each of the updates and/or changes that occur to the field. For example, the electronic device(s) can receive input indicating initial information associated with the field. The system can then receive, from the electronic device(s), an indication that the field was updated with the initial information. Based at least in part on the indication, the system can store data representing the initial information in the one or more databases. Additionally, the system can update the history table associated with the field. For example, the system can update the history table to indicate the update (e.g., the information) to the field, a time at which the update occurred, an identity of a user that made the update to the field, and/or so forth.

Later, the electronic device(s) can receive input indicating a change to the field (e.g., a change to the initial information for the field). The system can then receive, from the electronic device(s), an indication of the change to the field. Based at least in part on the indication, the system can store data representing the changed information in the one or more databases. Additionally, the system can update the history table associated with the field to indicate the change to the field (e.g., the change to the information), a time at which the change occurred, an identity of a user that made the change, a reason that the change occurred, and/or so forth. The system can then perform similar processes and/or techniques to continue to update the history table when updates and/or changes occur with the field. Additionally, the system can perform similar processes and/or techniques to updated history tables that are associated with other fields included within the record.

In some examples, the system can generate a history table for the record. The history table may indicate the updates and/or changes that occur to information included within the record (e.g., the updates and/or changes to the fields of the record). In some examples, the system can generate and/or update the history table when the system receives indications indicating that the information within the record was updated and/or changed. In some examples, the system can generate the history table based at least in part on receiving a query for the information (see below). For example, based at least in part on receiving the query, the system can generate the history table as including at least some of the information from the history tables that are associated with the fields of the record.

In some examples, the system may associate the record with data representing a table (referred to as a "clock table"). The clock table may store versions and timestamps for the record. In some examples, the version may be indicated using a version number, which the system may increment based on updates to the information within the record. In some examples, the system may then utilize the clock table to track when updates and/or changes occur with fields of the record.

For example, when the record is first created and/or when the record is updated with initial information, the system may store data representing that a current version of the record includes a first version. To store the data, the system may update the clock table to indicate the current version of the record and indicate a timestamp of when the update occurred. Additionally, when the system receives, from the electronic device(s), an indication of an update and/or a change to at least one field (e.g., update and/or change to information included within the at least one field), the system can increment the version number for the record. For example, if the system receives, from the electronic device(s), an indication that a field has been updated, the system may store data representing that the current version of the record includes a second version. To store the data, the system may update the table to indicate the updated version number and indicate a timestamp of when the change occurred. Additionally, if the system then receives, from the electronic device(s), an indication that a field of the record has been changed, the system may store data representing that the current version of the record includes a third version.

In some examples, the system can update the history tables based at least in part on the current version of the record. For example, if the system receives, from the electronic device(s), an indication that a first change has occurred with a field, the system can update the history table associated with the field to indicate that the first change is associated with a first version number, where the first version number corresponds to the current version of the record. Additionally, if the system receives, from the electronic device(s), an indication that a second change has occurred with the field, the system can update the history table to indicate that the first change is also associated with a second version number, where the second version number corresponds to the current version of the record. As such, the first change may be associated with a range of version numbers (e.g., a range from the first version number to the second version number), where the range indicates a number of versions of the record for which the field was left unchanged. Additionally, the system can update the history table to indicate that the second change is associated with the second version number.

In some examples, the system allows one or more users to query the data that represents the record. For a first example, the system may receive, from an electronic device, a query relating to changes that have occurred with a field of the record. Based at least in part on the query, the system may send, to the electronic device, data representing the history table associated with the query. For a second example, the system may receive, from an electronic device, a query relating to information included a field of the record during a specific version of the record. Based at least in part on the query, the system may analyze the history table associated with the field to identify the information that was included in the field during the specified version of the record. The system may then send, to the electronic device, data representing the information included in the field.

In some examples, by performing the processes and/or techniques described above, the system is capable of generating data that new and useful to users of the record. For example, the system is capable of generating various history tables for fields of the record. These history tables provide details about the updates and/or changes that occurred with the fields, and can be utilized to determine each time a user updates and/or changes the data associated with the record.

Additionally, by generating a respective history table for one or more of the fields of the record, the system is able to quickly search for and identify updates and/or changes to the various fields of the record. For example, such as during an audit, the system may be able to quickly search for and identify updates and/or changes that occurred to the record and/or updates and/or changes that occurred to one or more specific fields of the record. Additionally, in some examples, by using the version numbering when updating the history tables, the system is able to quickly search for and identify information related to various fields of the record during different versions of the record.

As described herein, a record may include a data structure that is stored in one or more databases, where data associated with the data structure may be generated, updated, and/or changed. The record may include a collection of fields, where one or more of the fields may include different data types. In some examples, data associated with one or more of the fields may be updated and/or changed. In some examples, once generated, data associated with one or more of the fields may not be updated and/or changed. In some examples, the record may be associated with a medical record, a dental record, patient records, a grievance, a report, and/or any other type of record that can be generated, updated, and/or changed.

In some examples, when data associated with a record is generated, updated, and/or changed, the data may be stored in one or more databases associated with the record. Additionally, the history tables associated with the record may be updated. In some examples, one or more of the history tables are updated when the data associated with the record is generated, updated, and/or changed. In some examples, one or more of the history tables are updated when the data associated with the record is stored in the one or more databases. In some examples, the system (and/or another electronic device) may update one or more of the history tables based at least in part on determining that the data associated with the record has been generated, updated, and/or changed. For example, the system (and/or other electronic device) may analyze the one or more databases to determine that the data associated with the record has been generated, updated, and/or changed. The system (and/or other electronic device) may then update one or more of the history tables using the data that was generated, updated, and/or changed. Still, in some examples, one or more of the history tables are generated and/or updated based at least in part on receiving a query for information associated with the record.

Although the above description includes the system storing the data associated with the record and/or generating the history tables associated with the record, in some examples, the electronic device(s) may store the data and/or generate the history tables. For example, an electronic device may receive the inputs associated with updating and/or changing the information included within the record. The electronic device may then store the data representing the information. Additionally, the electronic device may generate the history tables using the data.

FIG. 1 illustrates a schematic diagram of an example environment 100 for generating tables using data records, according to various examples of the present disclosure. The environment 100 may include a remote system 102, an electronic device 104 that is viewing and/or updating a record using a user interface 106, one or more additional electronic devices 108 that can view and/or update the record, and an electronic device 110 that can query for information associated with the record, for example. In some examples, the remote system 102 represents a system that generates and/or acquires data associated with one or more records and stores that data. In some examples, the electronic device 104 and/or the one or more electronic devices 108 may receive inputs from users and, based at least in part on the inputs, generate input data. The input data may indicate updates and/or changes to the record. Furthermore, in some examples, the electronic device 110 may receive inputs from users and, based at least in part on the inputs, generate input data. The input data may represent a query for information related to the record.

The electronic device 104, the one or more electronic devices 108, and/or the electronic device 110 may communicate with the remote system 102 via one or more networks 112. The communication may include sending and/or receiving of data 114 associated with the record. In some examples, the data 114 may represent updates and/or changes to the record (e.g., the input data generated by the electronic device 104 and/or the one or more electronic devices 108). For example, the remote system 102 may receive the data 114 when the electronic device 104 and/or the one or more electronic devices 108 receive input for updating and/or changing the record. In some examples, the data 114 may represent a query for information associated with the record (e.g., the input data generated by the electronic device 110).

The remote system 102 may include one or more components, such as, for example, processor(s) 116, network interface(s) 118, and memory 120. The memory 120 may include one or more components, such as, for example, a record component 122, a table component 124, a versioning component 126, a query component 128, a results component 130, and one or more databases 132 for storing data, such as the data 114 received from the electronic device 104, the one or more electronic devices 108, and the electronic device 110.

The one or more databases 132 may be configured to store data received by the remote system 102. For example, the one or more data databases 132 may be configured to receive and store the data 114 received from the electronic device 104, the one or more other electronic devices 108, and the electronic device 110. In some examples, the one or more databases 132, and/or one or more other components of the remote system 102, may be configured to format the data for storage in the one or more databases 132 such that the data is associated with an identifier of the record. For example, the data 114 associated with the record may be received from the electronic device 104, the one or more other electronic devices 108, and the electronic device 110. Each of the electronic device 104, the one or more other electronic devices 108, and the electronic device 110 may send the data 114 in the same or differing formats and/or may send the data 114 with differing identification formats. The one or more databases 132 and/or other components of the remote system 102 may be configured to associate the data 114 such that the data 114 is associated with the proper record in the remote system 102.

The record component 122 may be configured to generate and/or update the record using the data 114 received from the electronic device 104, the one or more other electronic devices 108, and the electronic device 110. For example, when the remote system 102 receives the data 114, the record component 122 may analyze the data 114 to determine that at least a portion of the data 114 identifies the record. For instance, the at least the portion of the data 114 may represent an identifier for the record. The identifier may include, but is not limited to, a name of the record, an identification number associated with the record, a name of the patient associated with the record, an identification number associated with the patient, and/or any other type of identifier that may be utilized to identify the record.

Based at least in part on identifying that the data 114 is associated with the record, the record component 122 may store the data 114 in the one or more databases 132. In some examples, the record component 122 stores the data 114 associated with the record in a single database 132. In other examples, the record component 122 stores the data 114 associated with the record in more than one of the databases 132. As discussed above, in some examples, when storing the data 114, the record component 122 may store the data 114 in association with the record.

In some examples, at a later time, such as when the remote system 102 receives data 114 associated with the record that updates and/or changes information included within the record, the record component 122 may store the additional data 114 in the one or more databases 132. Additionally, in some examples, the record component 122 may remove the previous data 114 that was updated and/or changed from the one or more databases 132. For instance, the record component 122 may only keep the most updated data 114 associated with the record in the one or more databases 132.

In some examples, the record component 122 may send the data 114 associated with the record to one or more devices, such as the electronic device 104, the one or more other electronic devices 108, and the electronic device 110. For example, if a user of the electronic device 104 wants to update and/or change information included within the record, the remote system 102 may receive data representing a request for the record. In some examples, the data may represent the identifier associated with the record. Based at least in part on the request, the record component 122 may analyze the one or more databases 132 to identify the data 114 associated with the record (and/or the most updated data 114 associated with the record). In some examples, the record component 122 may then cause the remote system 102 to send the data 114 to the electronic device 104. Using the data 114, the electronic device 104 may provide the most updated information for the record via the user interface 106. Additionally, or alternatively, the record component 122 may use the data 114 to generate the user interface that includes the most updated information. The record component 122 may then cause the remote system 102 to send, to the electronic device 104, record data 134 representing the record. The electronic device 104 may then use the record data 134 to generate the user interface 106.

The table component 124 may be configured to generate and update tables 136 associated with the record. For example, and as shown in the example of FIG. 1, the record includes fields 138(1)-(4), where each field 138(1)-(4) can be updated with respective information 140(1)-(4) that is relevant to the field 138(1)-(4). For example, if the record is associated with a patient, the first field 138(1) may be associated with a name of the patient, the second field 138(2) may be associated with the reason for the patient's visit, the third field 138(3) may be associated with tests performed on the patient, and the fourth field 138(4) may be associated with results of the tests. In some examples, information that is relevant to one or more of the fields cannot be changed once input into the record. For example, the first field 138(1) associated with the name of the patient may not be updated and/or changed once the information relevant to the first field 138(1) (e.g., the name) is input into the record. Additionally, or alternatively, in some examples, information that is relevant to one or more of the fields 138(1)-(4) can be updated and/or changed.

In some examples, the remote system 102 can identify one or more of the fields 138(1)-(4) included within the record. For a first example, the table component 124 may analyze the record (e.g., the data 114 associated with the record) to identify each of the fields 138(1)-(4) included within the record. For a second example, the remote system 102 can receive, from the electronic device 104 and/or the one or more other electronic devices 108, data 114 indicating the one or more of the fields 138(1)-(4) that are included within the record. In either example, the table component 124 can then generate a respective table 136 for one or more of the fields 138(1)-(4). The table 136 for a field 138(1)-(4) can then be updated to indicate each of the updates and/or changes that occur to the field 138(1)-(4).

For example, and as shown, the table component 124 can update a table 136 to indicate an identifier 142 of a user that updated and/or changed a field 138(1)-(4), information 144 within the field 138(1)-(4) that was updated and/or changed, a time 146 at which the field 138(1)-(4) was updated and/or changed, a reason 148 that the field 138(1)-(4) was updated and/or changed, and a version 150 of the record when the update and/or change occurred (where the version 150 is described below).

The identifier 142 may include, but is not limited to, a name, a username, a numerical identifier, an alphabetic identifier, a mixed numerical and alphabetic number, and/or any other type of identifier that may be used to identify a user. Additionally, the information 144 may include the information 140(1)-(4) that was updated and/or changed within the field 138(1)-(4) by the user. Furthermore, the time 146 may include, but is not limited to, a time of the day (e.g., 5:02 p.m., 10:00 p.m., etc.), a day of the week (e.g., Monday, Tuesday, Wednesday, etc.), a day of the year (e.g., March 12, July 17, October 19, etc.), and/or a year (e.g., 2017, 2018, etc.). Moreover, the reason 148 may indicate why the user made the change to the information 144. For example, if the user made the change because the wrong information 140(1)-(4) was inputted into the field 138(1)-(4), then the reason 148 may indicate that the information 140(1)-(4) was wrong and needed to be updated.

For an example of updating a table 136, while displaying the user interface 106 using the display 152, the electronic device 104 can receive input indicating initial information associated with the fourth field 138(4). Based at least in part on the input, the electronic device 104 may update the information 140(4) included in the fourth field 138(4) to indicate the initial information. Additionally, the electronic device 104 may send, to the remote system 102, data 114 representing the information 140(4), which the remote system 102 can store in the one or more databases 132. Additionally, using the data 114, the table component 124 can update the table 136 associated with the fourth field 138(4). For example, the remote system 102 can update the table 136 to indicate the update to the fourth field 138(4) (e.g., the initial information 144), a time 146 at which the update to the fourth field 138(4) occurred, an identifier 142 of the user that made the update to the fourth field 138(4), and/or so forth.

Later, the electronic device 104 (and/or one of the electronic devices 108) can receive input indicating a change to the fourth field 138(4) (e.g., a change to the information 140(4) included in the fourth field 138(4)). Based at least in part on the input, the electronic device 104 may update and/or change the information 140(4) included in the fourth field 138(4) to indicate the new information. Additionally, the electronic device 104 may send, to the remote system 102, data 114 representing the new information 140(4), which the remote system 102 may store in the one or more databases 132. Additionally, using the data 114, the table component 124 can update the table 136 associated with the fourth field 138(4) to indicate the change to the fourth field 138(4) (e.g., the change to the information 140(4)), a time 146 at which the change to the fourth field 138(4) occurred, an identifier 142 of a user that made the change to the fourth field 138(4), a reason 148 that the change to the fourth field 138(4) occurred, and/or so forth. The table component 124 can then perform similar processes and/or techniques to continue to update the table 136 when updates and/or changes occur to the record. Additionally, the remote system 102 can perform similar processes and/or techniques to generate and update other tables 136 that are associated with the other fields 138(1)-(3) included within the record.

In some examples, the table component 124 can generate a table 136 for the record. The table 136 may indicate the updates and/or changes that occur to the information 140(1)-(4) included within the record (e.g., the updates and/or changes to the fields 138(1)-(4) of the record). In some examples, the table component 124 can generate and/or update the table 136 when the remote system 102 receives the data 114 indicating that the information 140(1)-(4) has been updated and/or changed. In some examples, the table component 124 can generate the table 136 based at least in part on receiving a query for the information 140(1)-(4) (see below). For example, based at least in part on receiving the query, the table component 124 can generate the table 136 as including at least some of the information from the tables 136 that are associated with the fields 138(1)-(4) of the record.

The versioning component 126 can determine, update, and/or set a version number associated with the record. In some examples, to determine, update, and/or set a version number associated with the record, the versioning component 126 may utilize a clock table associated with the record. The clock table may indicate various versions numbers associated with the record and timestamps for which updated and/or changes occurred with the record. As such, in some examples, the versioning component 126 may update the clock table when the updates and/or changes occur with the record by incrementing the version numbers for the table and adding timestamps corresponding to the updates and/or changes.

For example, when the record is initially created and/or when the record is updated with initial information, the versioning component 126 may store (e.g., in the one or more databases 132) data representing that a current version of the record includes a first version. Additionally, or alternatively, the versioning component 126 may update the clock table associated with the record to indicate the current version and indicate a timestamp of when the update occurred. Additionally, when the remote system 102 receives, from the electronic device 104 and/or the one or more electronic devices 108, the data 114 indicating an update and/or a change to at least one field 138(1)(4) (e.g., update and/or change to the information 140(1)-(4) included in the at least one field 138(1)-(4)), the versioning component 126 can increment the version number for the record. For example, if the remote system 102 receives, from the electronic device 104, the data 114 indicating that the fourth field 138(4) has been updated and/or changed, the versioning component 126 may store data representing that the current version of the record includes a second version. Additionally, or alternatively, the versioning component 126 may update the clock table to indicate the second version for the record and indicate a timestamp for when the update and/or change occurred.

Furthermore, if the remote system 102 then receives, from the electronic device 104, the data 114 indicating that the third field 138(3) of the record has been updated and/or changed, then the versioning component 126 may store data representing that the current version of the record includes a third version. Additionally, or alternatively, the versioning component 126 may update the clock table to indicate the third version of the record and indicate a timestamp for when the update and/or change occurred.

In some examples, the versions may be updated using integers. For example, the first version of the record may include version 1, the second version of the record may include version 2, the third version of the record may include version 3, and so forth. In some examples, the versions may be updated using other techniques. For a first example, the first version of the record may include version 1.0, the second version of the record may include version 1.5, the third version of the record may include version 2.0, and so forth. For a second example, the first version of the record may include version A, the second version of the record may include version B, the third version of the record may include version C, and so forth. For a third example, the first version of the record may include version A1, the second version of the record may include version A2, the third version of the record may include version A3, and so forth. While these are just a few examples of how versioning may occur with the record, in other examples, any technique may be used to indicate the current version of the record.

In some examples, the table component 124 can update the tables 136 for the fields 138(1)-(4) based at least in part on the current version of the record. For example, if the remote system 102 receives, from the electronic device 104, data 114 indicating a first change to information 140(4) included within the fourth field 138(4), the table component 124 can update the table 136 associated with the fourth field 138(4) to indicate that the first change is associated with a first version number, where the first version number corresponds to the current version of the record (e.g., after the first change). Additionally, if the remote system 102 receives, from the electronic device 104, data 114 indicating a second change has occurred with the information 140(4) of the fourth field 138(4), the table component 124 can update the table 136 to indicate that the first change is also associated with a second version number, where the second version number corresponds to the current version of the record (e.g., after the second change). As such, the first change may be associated with a range of version numbers (e.g., a range from the first version number to the second version number), where the range indicates a number of versions of the record for which the fourth field 138(4) was left unchanged. Additionally, the table component 124 can update the table 136 to indicate that the second change is associated with the second version number.

The query component 128 may be configured to retrieve information associated with the record based at least in part on queries received from devices. For a first example, the remote system 102 may receive, from the electronic device 110, data 114 representing a query related to changes that have occurred with the third field 138(3) of the record. For instance, the query may indicate at least the identifier associated with the record and/or the identifier associated with the third field 138(3). Based at least in part on the query, the query component 128 may search for and retrieve the table 136 associated with the third field 138(3) and/or the current included in the third field 138(3). The results component 130 may then be configured to generate record data 134 representing the table 136 associated with the third field 138(3) and/or the current information included in the third field 138(3). The remote system 102 may then send the record data 134 to the electronic device 110.

For a second example, the remote system 102 may receive, from the electronic device 110, data 114 representing a query related to retrieving information related to the third field 138(3) when the record was on its third version. For instance, the query may indicate at least the identifier associated with the record, the identifier associated with the third field 138(3), and/or an indication of the third version of the record. Based at least in part on the query, the query component 128 may search for and retrieve the table 136 associated with the third field 138(3) (e.g., using the identifier associated with the record and/or the identifier associated with the third field 138(3)). Additionally, the query component 128 may analyze the table 136 associated with the third field 138(3) to identify the information 144 that was related to the third field 138(3) during the third version 150 of the record. The results component 130 may then generate record data 134 representing the results of the search and analysis. The remote system 102 may then send the record data 134 to the electronic device 110.

For a third example, the remote system 102 may receive, from the electronic device 110, data 114 representing a query related to changes that occurred with the third field 138(3) between the second version of the record and the fifth version of the record. For instance, the query may indicate at least the identifier associated with the record, the identifier associated with the third field 138(3), and/or an indication of a range between the second version of the record and the fifth version of the record. Based at least in part on the query, the query component 128 may search for and retrieve the table 136 associated with the third field 138(3) (e.g., using the identifier associated with the record and/or the identifier associated with the third field 138(3)). The query component 128 may then analyze the table 136 to determine the information 144 included in the third field 138(3) between the second version 150 of the record and the fifth version 150 of the record, time(s) 146 at which the third field 138(3) was updated and/or changed between the second version 150 of the record and the fifth version 150 of the record, identifier(s) 142 of user(s) that updated and/or changed the third field 138(3) between the second version 150 of the record and the fifth version 150 of the record, reason(s) 148 for the update(s) and/or change(s) to the third field 138(3) between the second version 150 of the record and the fifth version 150 of the record, and/or the like. The results component 130 may then generate record data 134 representing the results from the search and analysis. The remote system 102 may then send the record data 134 to the electronic device 110.

As further illustrated in FIG. 1, the remote system 102 may store activity data 154. Activity data 154 may indicate associations (which may be referred to as "activities") between updates and/or changes that occur with multiple fields 138(1)-(4) of the record and/or may indicate associations (which may also be referred to as "activities") between updates and/or changes that occur between fields of multiple records. For a first example, if a user updates the information 140(1) included in the first field 138(1) of the record and the information 140(2) included in the second field 138(2) of the record, the remote system 102 may generate activity data 154 indicating that the user updated both the first field 138(1) and the second field 138(2) at a similar time. For a second example, if a patient is associated with multiple records, a user may update both a field included in a first record and a field included in a second record. The remote system 102 may then generate activity data 154 indicating that the user updated both the field included in the first record and the field included in the second record at a similar time.

In some examples, the activity data 154 may be useful when querying the remote system 102 for information associated with records. For example, the remote system 102 may receive, from the electronic device 110, data 114 representing a query related to changes that have occurred with the record by a given user. For instance, the query may indicate at least the identifier associated with the record and/or an identifier associated with the user. Based at least in part on the query, the query component 128 may search for and retrieve the table 136. The query component 128 may then analyze the record and/or the tables 136 to determine that the user made a first change to one of the fields 138(1)-(4) of the record. Additionally, the query component 128 may use the activity data 154 to determine that the user further made a second change to one of the fields 138(1)-(4) of the record at a similar time at which the user made the first change. The remote system 102 may then send, to the electronic device 110, data indicating both of the changes that occurred.

As used herein, a processor, such as processor(s) 116, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 116 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 116 may possess its own local memory, which also may store program components, program data, and/or one or more operating systems.

The memory 120 may include volatile and nonvolatile memory, removable and non-removable media implemented in any method or technology for storage of information, such as computer-readable instructions, data structures, program component, or other data. Such memory 120 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 120 may be implemented as computer-readable storage media ("CRSM"), which may be any available physical media accessible by the processor(s) 116 to execute instructions stored on the memory 120. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 116.

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 120, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 118 may enable communications between the components and/or devices shown in environment 100 and/or with one or more other remote systems, as well as other networked devices. Such network interface(s) 118 may include one or more network interface controllers (NICs) or other types of transceiver devices to send and receive communications over the network 112. For instance, each of the network interface(s) 118 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 112 may include a wide area network (WAN) component to enable communication over a wide area network.

Figure 2:
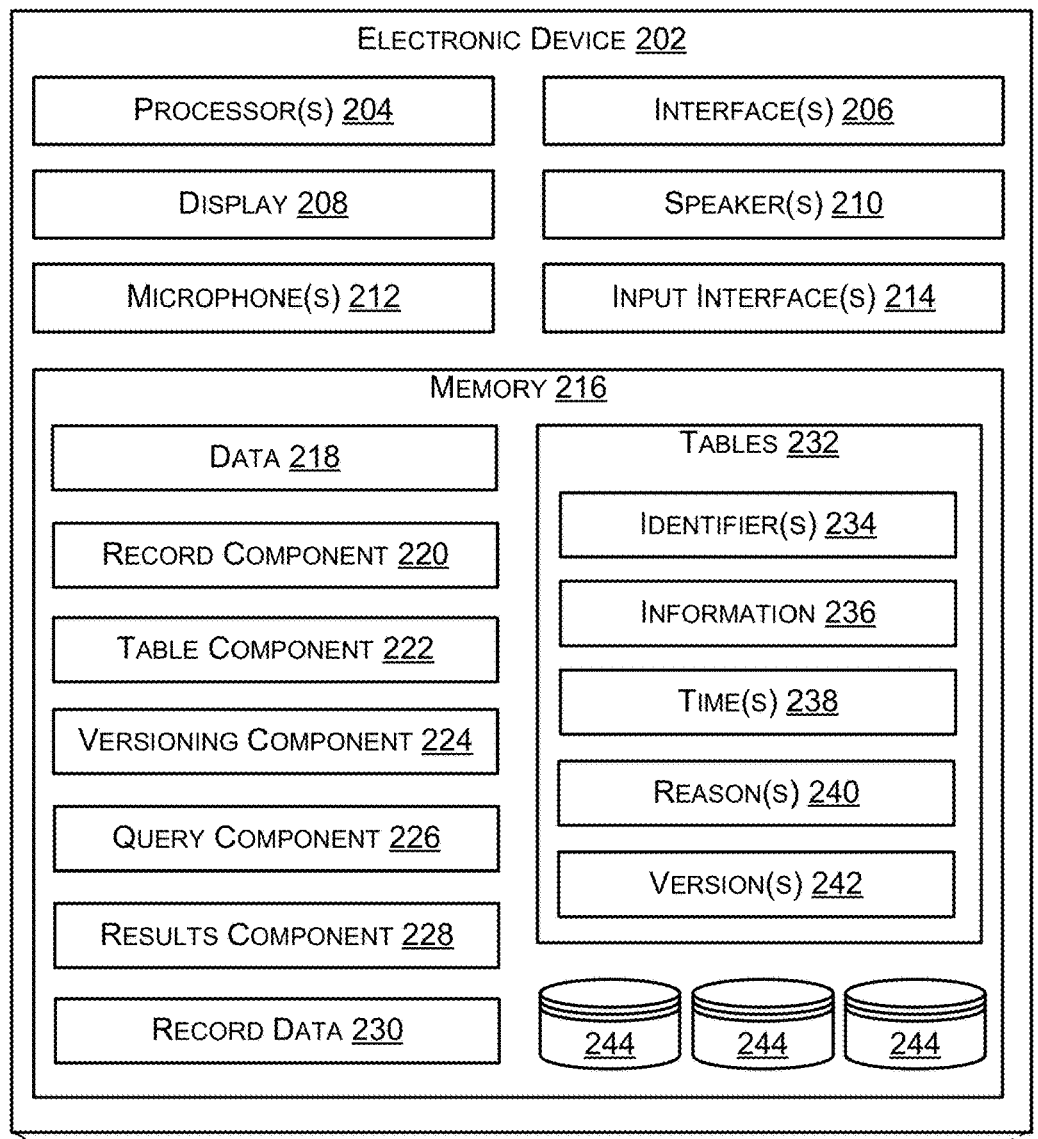
FIG. 2 illustrates a block diagram of an example electronic device that can generate and update tables using associated with a record, as well as perform searches for data and/or information associated with the record, according to various examples of the present disclosure.

Although the above description includes the remote system 102 generating and updating tables 136, as well as performing searches for data and/or information associated with the record, in other examples, an electronic device may perform some and/or all of the processes and techniques described herein for the remote system 102. For example, FIG. 2 illustrates a block diagram of an example electronic device 202 that can generate tables using a data record, as well as perform searches for data and/or information associated with the record, according to various examples of the present disclosure. In some examples, the electronic device 202 may correspond to, and/or be similar to, one or more of the electronic device 104, the one or more electronic devices 108, and/or the electronic device 110.

As shown, the electronic device 202 may include processor(s) 204 (which may correspond to, and/or be similar to, the processor(s) 116), network interface(s) 206 (which may correspond to, and/or be similar to, the network interface(s) 118), a display 208, speaker(s) 210, microphone(s) 212, input interface(s) 214 (a mouse, a trackball, a touchpad, a joystick, a pointing stick, a stylus, etc.), and a memory 216 (which may correspond to, and/or be similar to, the memory 120). In some examples, the electronic device 202 may include additional components not shown in FIG. 2. Additionally, or alternatively, in some examples, the electronic device 202 may not include one or more of the components shown in FIG. 2.

As shown in the example of FIG. 2, the memory 216 may store data 218, a record component 220, a table component 222, a versioning component 224, a query component 226, a results component 228, record data 230, tables 232, identifier(s) 234, information 236, time(s) 238, reason(s) 240, version(s) 242, and one or more databases 244. In some examples, the data 218, the record component 220, the table component 222, the versioning component 224, the query component 226, the results component 228, the record data 230, the tables 232, the identifier(s) 234, the information 236, the time(s) 238, the reason(s) 240, the version(s) 242, and the one or more databases 244 may correspond respectively to, and/or be respectively similar to, the data 114, the record component 122, the table component 124, the versioning component 126, the query component 128, the results component 130, the record data 134, the tables 136, the identifier(s) 142, the information 144, the time(s) 146, the reason(s) 148, the version(s) 150, and the one or more databases 132.

As discussed above, in some examples, the electronic device 202 may perform some and/or all of the processes of the remote system 102. For example, the electronic device 202 can receive inputs associated with updating and/or changing a record. Based at least in part on the inputs, the electronic device may generate data 218 representing the updates and/or changes. The electronic device 202 may then use the record component 220 to store the data 218 in the one or more databases 244. Additionally, the electronic device 202 may utilize the table component 222 to generate and/or update the tables 232 using the data 218, using the processes described above. Furthermore, the electronic device 202 may utilize the versioning component 224 and the table component 222 to update the version numbers for the record and/or the tables 232.

In some examples, the electronic device 202 may receive inputs associated with querying information related to the record. Based at least in part on the inputs, the electronic device 202 may generate data 218 representing the queries. Using the data 218, the electronic device 202 may then utilize the query component 226 to search for and identify the information and/or tables 232 related to a query. Additionally, the electronic device 202 may utilize the results component 228 to provide the results (e.g., the information and/or tables 232) to the user.

Figure 3A:
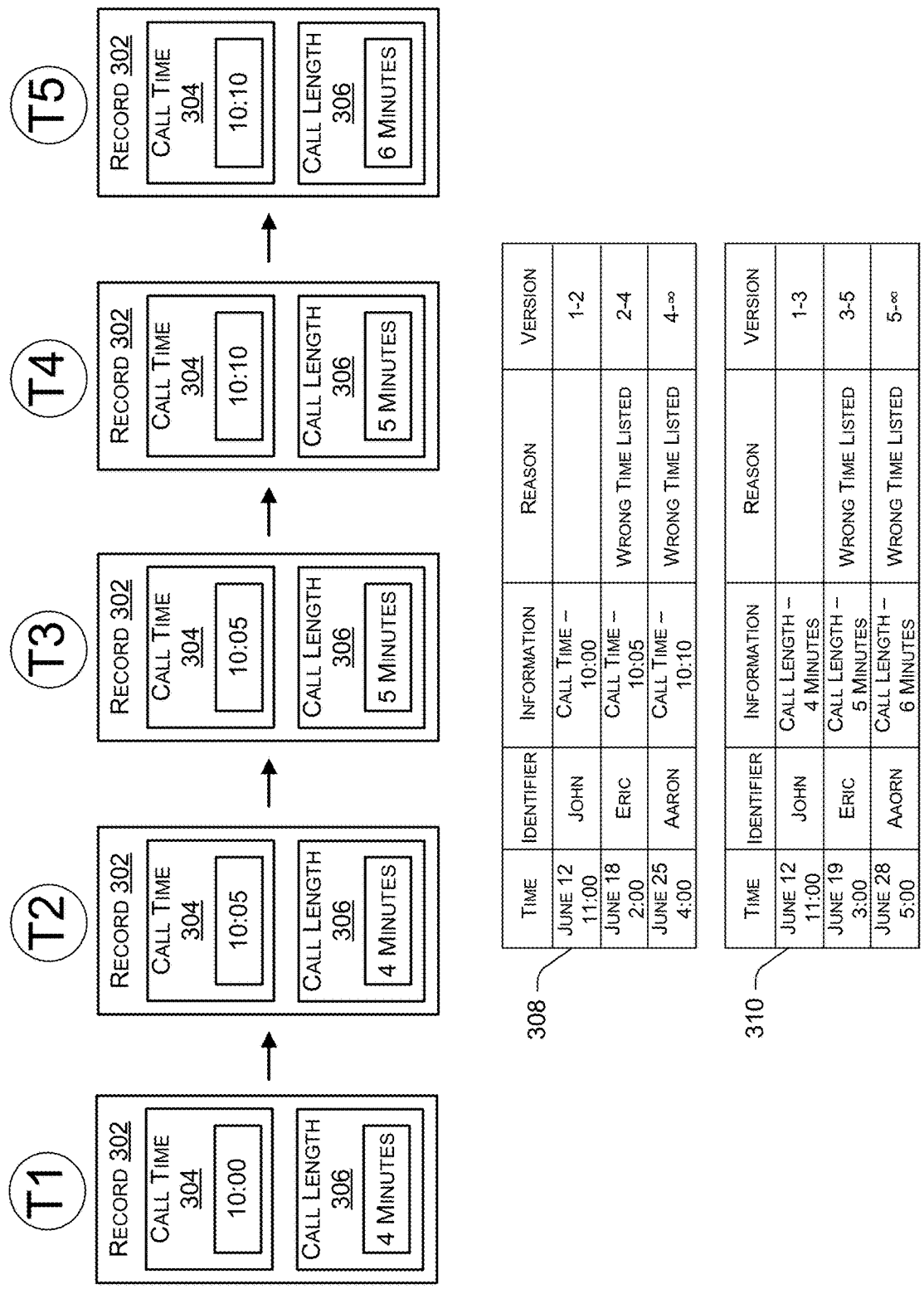
FIG. 3A illustrates an example of generating history tables for various fields of a record, according to various examples of the present disclosure.

FIG. 3A illustrates an example of generating history tables for various fields of a record, according to various examples of the present disclosure. For example, users may be utilizing electronic device(s) (e.g., the electronic device 104, the one or more electronic devices 108, the electronic device 202) to generate a record 302 for a call log. The record 302 may include multiple fields, such as a first field associated with call times 304 and a second field associated with call lengths 306. The remote system 102 (and/or the electronic device 104, the one or more electronic devices 108, the electronic device 202) may then generate at least a first table 308 for the first field and a second table 310 for the second field. In some examples, each of the first table 308 and the second table 310 may correspond to, and/or be similar to, one of the tables 136.

As shown, at a first time T1, June 12 at 11:00, a first user associated with an identifier "John" inputs, into the electronic device(s), information associated with a phone call that occurred. The information indicates that a call was made at 10:00 and lasted for a length of 4 minutes. Based at least in part on the inputs, the remote system 102 may receive data representing the updates to the record 302. The remote system 102 may then use the data to update the first table 308 to indicate that a time for the update includes June 12 at 11:00, an identifier for the user includes John, the updated information includes that the call time was at 10:00, and a version of the record 302 associated with the update includes Version 1. Additionally, the remote system may use the data to update the second table 310 to indicate that a time for the update includes June 12 at 11:00, an identifier for the user includes John, the updated information includes that the call length was 4 minutes, and a version of the record 302 includes Version 1.

Later, at a second time T2, June 18 at 2:00, a second user associated with an identifier "Eric" inputs, into the electronic device(s), changes to the information associated with the phone call. The changes indicate that the call was actually made at 10:05. Based at least in part on the inputs, the remote system 102 may receive data representing the changes to the information of the record 302. The remote system 102 may then use the data to update the first table 308 to indicate that a time for the changes includes June 18 at 2:00, an identifier for the user includes Eric, the changed information includes that the call time was at 10:05, and a reason for the change was that the wrong time was listed. Additionally, the remote system 102 may update the version for the first entry of the first table 308 to include a range from Version 1-2. Furthermore, the remote system 102 may update the version for the second entry of the first table 308 to include Version 2.

Later, at a second time T3, June 19 at 3:00, the second user associated with the identifier "Eric" inputs, into the electronic device(s), changes to the information associated with the phone call. The changes indicate that the call length was actually 5 minutes. Based at least in part on the inputs, the remote system 102 may receive data representing the changes to the information of the record 302. The remote system 102 may then use the data to update the second table 310 to indicate that a time for the changes includes June 19 at 3:00, an identifier for the user includes Eric, the changed information includes that the call length was 5 minutes, and a reason for the change was that the wrong time was listed. Additionally, the remote system 102 may update the version of the first entry of the second table 310 to include a range from Versions 1-3. Furthermore, the remote system 102 may update the version of the second entry of the second table 310 to include Version 3.

Later, at a second time T4, June 25 at 4:00, a third user associated with an identifier "Aaron" inputs, into the electronic device(s), changes to the information associated with the phone call. The changes indicate that the call was actually made at 10:10. Based at least in part on the inputs, the remote system 102 may receive data representing the changes to the information of the record 302. The remote system 102 may then use the data to update the first table 308 to indicate that a time for the changes includes June 25 at 4:00, an identifier for the user includes Aaron, the changed information includes that the call time was at 10:10, and a reason for the change was that the wrong time was listed. Additionally, the remote system 102 may update the version of the second entry of the first table 308 to include a range from Versions 2-4. Furthermore, the remote system 102 may update the version of the third entry of the first table 308 to include Version 4.

Later, at a second time T5, June 28 at 5:00, the second user associated with the identifier "Aaron" inputs, into the electronic device(s), changes to the information associated with the phone call. The changes indicate that the call length was actually 6 minutes. Based at least in part on the inputs, the remote system 102 may receive data representing the changes to the information of the record 302. The remote system 102 may then use the data to update the second table 310 to indicate that a time for the changes includes June 28 at 5:00, an identifier for the user includes Aaron, the changed information includes that the call length was 6 minutes, and a reason for the change was that the wrong time was listed. Additionally, the remote system 102 may update the version of the second entry of the second table 310 to include a range from Versions 3-5. Furthermore, the remote system 102 may update the version of the third entry of the second table 310 to include Version 5.

As further illustrated in the example of FIG. 3A, if the information within the record 302 at time T5 is current, then the remote system 102 may update the first table 308 to indicate that the version for the third entry includes Versions 4-∞. This may indicate that the information (e.g., the call time including 10:10) included within the third entry of the first table 308 is current. Additionally, the remote system 102 may update the second table 310 to indicate that the version for the third entry includes Versions 5-∞. This may indicate that the information (e.g., the call length including 6 minutes) included within the third entry of the second table 310 is current. Although using a "∞" symbol is shown in the example of FIG. 3A, in other examples, any other type of symbol may be utilized to indicate that an entry within a table is current.

FIG. 3B illustrates an example of generating a history table 312 for the record 302 of FIG. 3A, according to various examples of the present disclosure. As shown, the table 312 indicates each of the updates and/or changes that were made to the record 302. However, the version number associated with each of the updates and/or changes is different for the table 312 associated with the record 302 than the first table 308 associated with the first field and the second table 310 associated with the second field.

For instance, and as illustrated in FIG. 3B, the version indicates that, based at least in part on the update to the call time and the update to the call length, the record included Version 1. This may be because the updates included initial information for the record 302 and as such, the record 302 was on its first version. Later, and based at least in part on the first change to the call time, the record included Version 2. This may be because the information within the record 302 was changed and as such, the record 302 was on its second version. Furthermore, each time that there was a change to the information included within the record 302, the version number for the record 302 was incremented. Users that are analyzing this table 312 may thus use the version number to determine the number of times that the record 302 has been updated. Additionally, the user may use version number to determine which information was changed within the record 302 each time a change occurred.

FIG. 4 illustrates an example user interface that may be utilized to search through history tables in order to identify changes that occurred with a record, according to various examples of the present disclosure. For example, an electronic device (e.g., the electronic device 104, the one or more electronic devices 108, the electronic device 110, the electronic device 202) may be displaying the user interface 402. The user interface 402 can include a first portion 404 that includes information associated with a record 406 and a second portion 408 that includes history tables 410(1)-(2) associated with fields of the record 406. For example, the first table 410(1) may be associated with a first field 412(1) of the record 406 and the second table 410(2) may be associated with a second field 412(2) of the record 406. As such, the first table 410(1) indicates the updates and/or changes that have occurred with the information included within the first field 412(1) and the second table 410(2) indicates the updates and/or changes that have occurred with the information included within the second field 412(2).

In some examples, in order to search for a table associated with a field of the record 406, the electronic device may receive an input selecting the table within the record 406. For example, the electronic device may have received an input selecting the first field 412(1). Based at least in part on the input, the electronic device may have sent, to the remote system 102, data representing a query for a history of the first field 412(1). The electronic device may then have received, from the remote system 102, data representing the first table 410(1). Using the data, the electronic device may display the first table 410(1) to the user.

Additionally, or alternatively, in some examples, in order to search for a table associated with a field of the record 406, the user interface 402 may include a search bar (not shown) that allows the user to input a query. In such examples, the electronic device may receive an input associated with inputting the query into the search bar. For example, the electronic device may have received an input indicating that the user wants to view a history associated with the first field 412(1) of the record 406. Based at least in part on the input, the electronic device may have sent, to the remote system 102, data representing the query for the history of the first field 412(1). The electronic device may then have received, from the remote system 102, data representing the first table 410(1). Using the data, the electronic device may display the first table 410(1) to the user.

While these are just a couple of examples of ways to search for information associated with the record 406, in other examples, a user may utilize other ways to search for the information associated with the record 406. Additionally, while the user interface 402 includes the first portion 404 located on a left side of the user interface 402 and the second portion 408 located on a right side of the user interface 402, in other example, the first portion 404 and/or the second portion 408 may be located at different areas of the user interface 402.

Each of the processes described herein, including the processes 500, 600, 700, 800, 900, 1000, and 1100, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 5A:
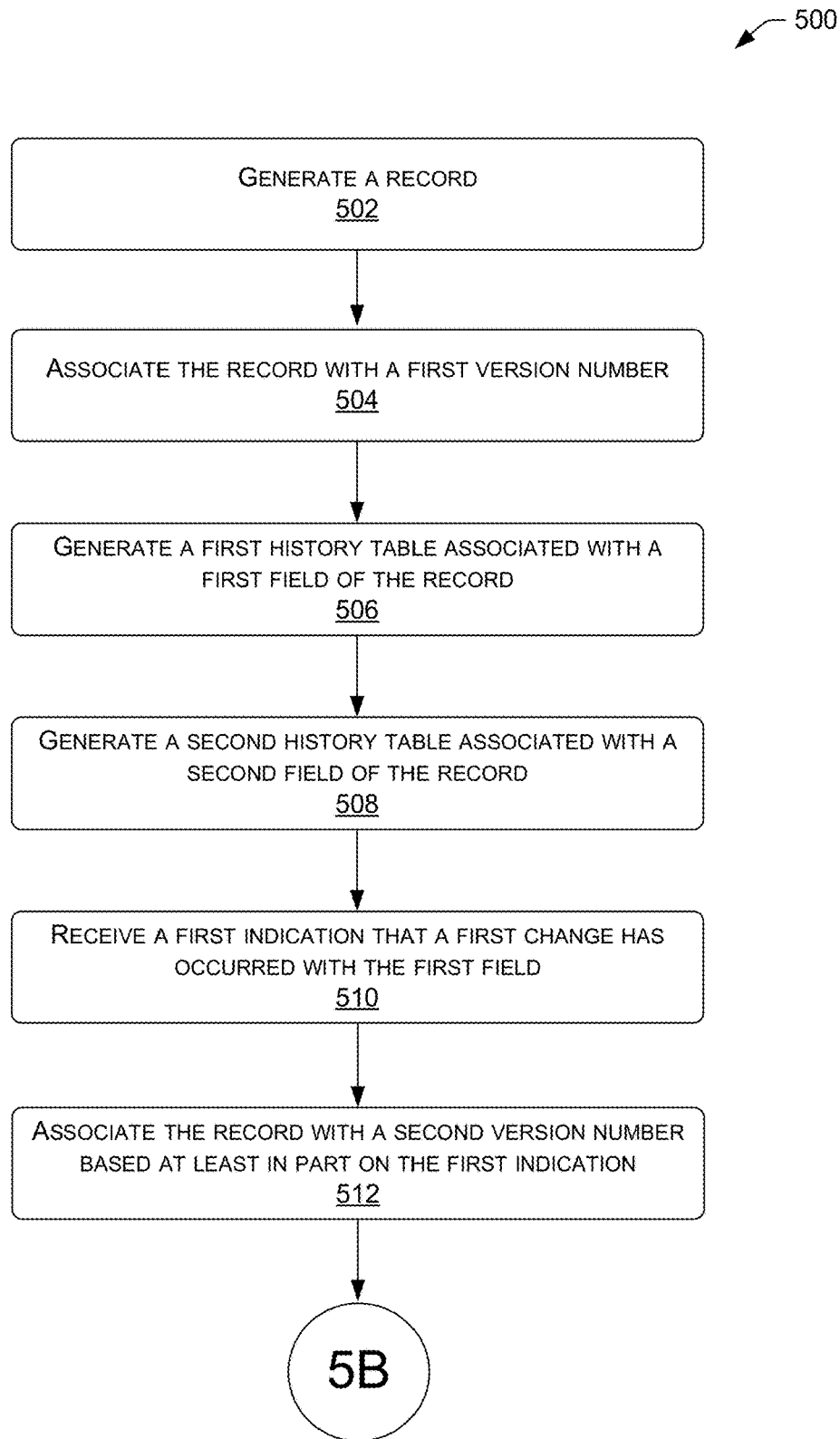
FIGS. 5A-5B illustrate a flow diagram of an example process for generating history tables associated with fields of a record, according to various examples of the present disclosure.
Figure 5B:
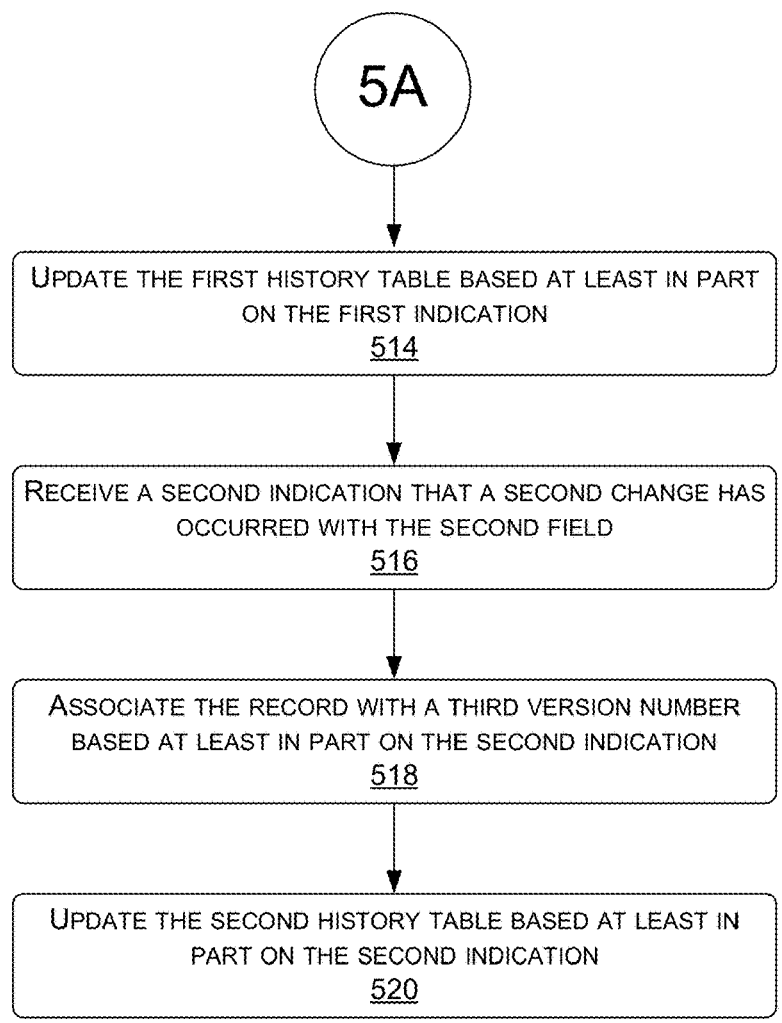

FIGS. 5A-5B illustrate a flow diagram of an example process 500 for generating history tables associated with fields of a record, according to various examples of the present disclosure. Even though the example process 500 of FIGS. 5A-5B is described as being performed by the remote system 102, in other examples, at least some of the example process 500 of FIGS. 5A-5B may be performed by one or more other electronic devices. For example, at least some of the example process 500 of FIGS. 5A-5B may be performed by the electronic device 104, the one or more electronic devices 108, the electronic device 110, and/or the electronic device 202.

At block 502, the process 500 includes generating a record. For example, the remote system 102 may generate a record associated with an event. In some examples, the remote system 102 generates the record based at least in part on receiving, from electronic device(s), data associated with the record. The remote system 102 may then store the data in a database.

At block 504, the process 500 includes associating the record with a first version number. For example, the remote system 102 may associate the record with the first version number. In some examples, the remote system 102 associates the record with the first version number based at least in part on generating the record. In some examples, the remote system 102 associates the record with the first version number based at least in part on receiving data representing initial information input into the record. In some examples, the remote system 102 associates the record with the first version number by storing, in association with the record, data representing the first version number.

At block 506, the process 500 includes generating a first history table associated with a first field of the record. For example, the remote system 102 may generate the first history table associated with the first field of the record. In some examples, the remote system 102 identifies the first field by analyzing the record. In some examples, the remote system 102 identifies the first field by receiving, from the electronic device(s), data indicating that the record includes the first field. Still, in some examples, the remote system 102 identifies the first field by receiving, from the electronic device(s), data representing information input into the first field.

At block 508, the process 500 includes generating a second history table associated with a second field of the record. For example, the remote system 102 may generate the second history table associated with the second field of the record. In some examples, the remote system 102 identifies the second field by analyzing the record. In some examples, the remote system 102 identifies the second field by receiving, from electronic device(s), data indicating that the record includes the second field. Still, in some examples, the remote system 102 identifies the second field by receiving, from the electronic device(s), data representing information input into the second field.

At block 510, the process 500 includes receiving a first indication that a first change has occurred with the first field. For example, the remote system 102 may receive, from the electronic device(s), data representing that the first change has occurred with the first field. In some examples, the data may represent that information was added to the first field of the record. In some examples, the data may represent that information that was included within the first field was changed to new information.

At block 512, the process 500 includes associating the record with a second version number based at least in part on the first indication. For example, based at least in part on the record being updated and/or changed, the remote system 102 may associate the record with the second version number. In some examples, the remote system 102 may increment the first version number to create the second version number. For example, the first version number may include 1 and the second version number may include 2. In some examples, the remote system 102 associates the record with the second version number by storing, in association with the record, data representing the second version number.

At block 514, the process 500 includes updating the first history table based at least in part on the first indication. For example, the remote system 102 may update the first history table based at least in part on the first indication. In some examples, the remote system 102 updates the first history table to indicate the first change that occurred with the first field, a first time at which the first change occurred with the first field, a first identity associated with a user that made the first change, a reason for the first change, and/or that the first change is associated with the second version number.

At block 516, the process 500 includes receiving a second indication that a second change has occurred with the second field. For example, the remote system 102 may receive, from the electronic device(s), data representing that the second change has occurred with the second field. In some examples, the data may represent that information was added to the second field of the record. In some examples, the data may represent that information that was included within the second field was changed to new information.

At block 518, the process 500 includes associating the record with a third version number based at least in part on the second indication. For example, based at least in part on the record being updated and/or changed, the remote system 102 may associate the record with the third version number. In some examples, the remote system 102 may increment the second version number to create the third version number. For example, the second version number may include 2 and the third version number may include 3. In some examples, the remote system 102 associates the record with the third version number by storing, in association with the record, data representing the third version number.

At block 520, the process 500 includes updating the second history table based at least in part on the second indication. For example, the remote system 102 may update the second history table based at least in part on the second indication. In some examples, the remote system 102 updates the second history table to indicate the second change that occurred with the second field, a second time at which the second change occurred with the second field, a second identity associated with a user that made the second change, a reason for the second change, and/or that the second change is associated with the second version number.

Figure 6:
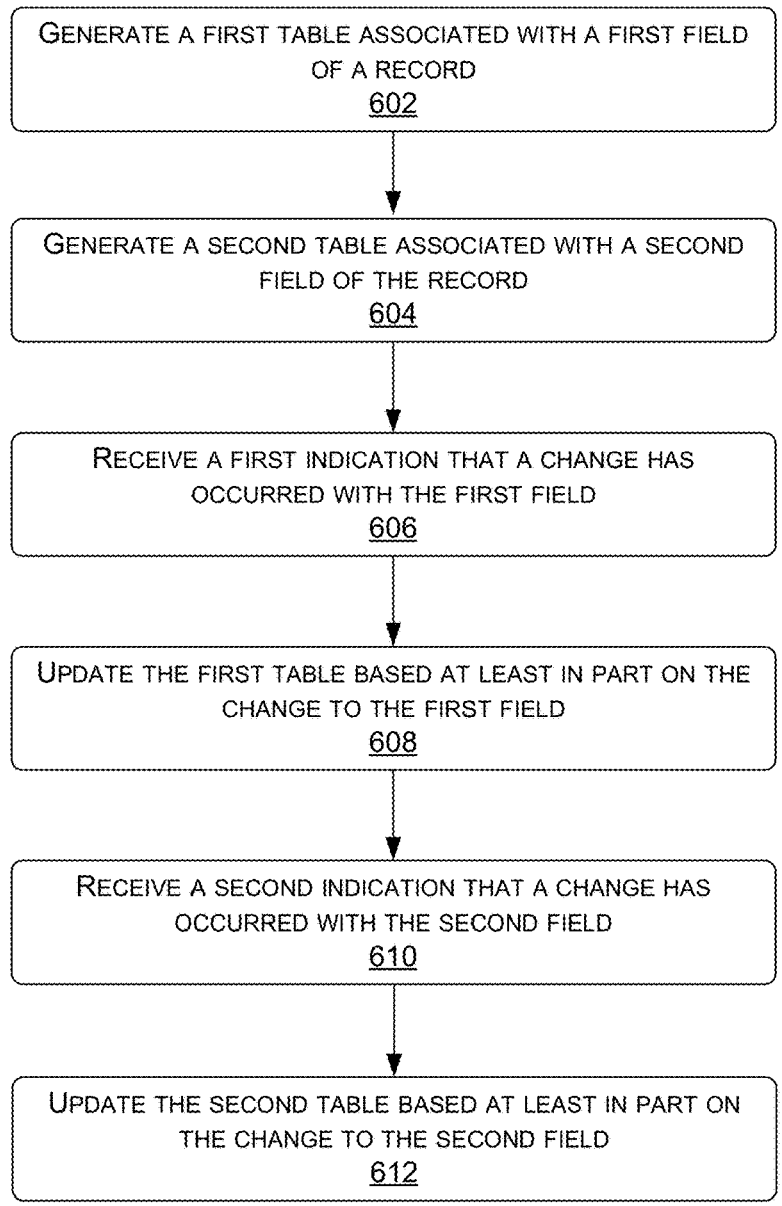
FIG. 6 illustrates a flow diagram of another example process for generating history tables associated with fields of a record, according to various examples of the present disclosure.

FIG. 6 illustrates a flow diagram of another example process 600 for generating history tables associated with fields of a record, according to various examples of the present disclosure. Even though the example process 600 of FIG. 6 is described as being performed by the remote system 102, in other examples, at least some of the example process 600 of FIG. 6 may be performed by one or more other electronic devices. For example, at least some of the example process 600 of FIG. 6 may be performed by the electronic device 104, the one or more electronic devices 108, the electronic device 202, and/or the electronic device 202.

At block 602, the process 600 includes generating a first table associated with a first field of a record. For example, the remote system 102 may generate the first table associated with the first field of the record. In some examples, the remote system 102 identifies the first field by analyzing data associated with the record. In some examples, the remote system 102 identifies the first field by receiving, from electronic device(s), data indicating that the record includes the first field. Still, in some examples, the remote system 102 identifies the first field by receiving, from the electronic device(s), data representing information input into the first field.

At block 604, the process 600 includes generating a second table associated with a second field of the record. For example, the remote system 102 may generate the second table associated with the second field of the record. In some examples, the remote system 102 identifies the second field by analyzing the data associated with the record. In some examples, the remote system 102 identifies the second field by receiving, from the electronic device(s), data indicating that the record includes the second field. Still, in some examples, the remote system 102 identifies the second field by receiving, from the electronic device(s), data representing information input into the second field.

At block 606, the process 600 includes receiving a first indication that a change has occurred with the first field. For example, the remote system 102 may receive, from the electronic device(s), data representing that the change has occurred with the first field. In some examples, the data may represent that information was added to the first field of the record. In some examples, the data may represent that information that was included within the first field was changed to new information.

At block 608, the process 600 includes updating the first table based at least in part on the change to the first field. For example, the remote system 102 may update the first table based at least in part on the change to the first field. In some examples, the remote system 102 updates the first table to indicate the change that occurred with the first field, a first time at which the change occurred with the first field, a first identity associated with a user that made the change, a reason for the change, and/or that the change is associated with a version number.

At block 610, the process 600 includes receiving a second indication that a change has occurred with the second field. For example, the remote system 102 may receive, from the electronic device(s), data representing that the change has occurred with the second field. In some examples, the data may represent that information was added to the second field of the record. In some examples, the data may represent that information that was included within the second field was changed to new information.

At block 612, the process 600 includes updating the second table based at least in part on the change to the second field. For example, the remote system 102 may update the second table based at least in part on the change to the second field. In some examples, the remote system 102 updates the second table to indicate the change that occurred with the second field, a second time at which the change occurred with the second field, a second identity associated with a user that made the change, a reason for the change, and/or that the change is associated with a version number.

Figure 7A:
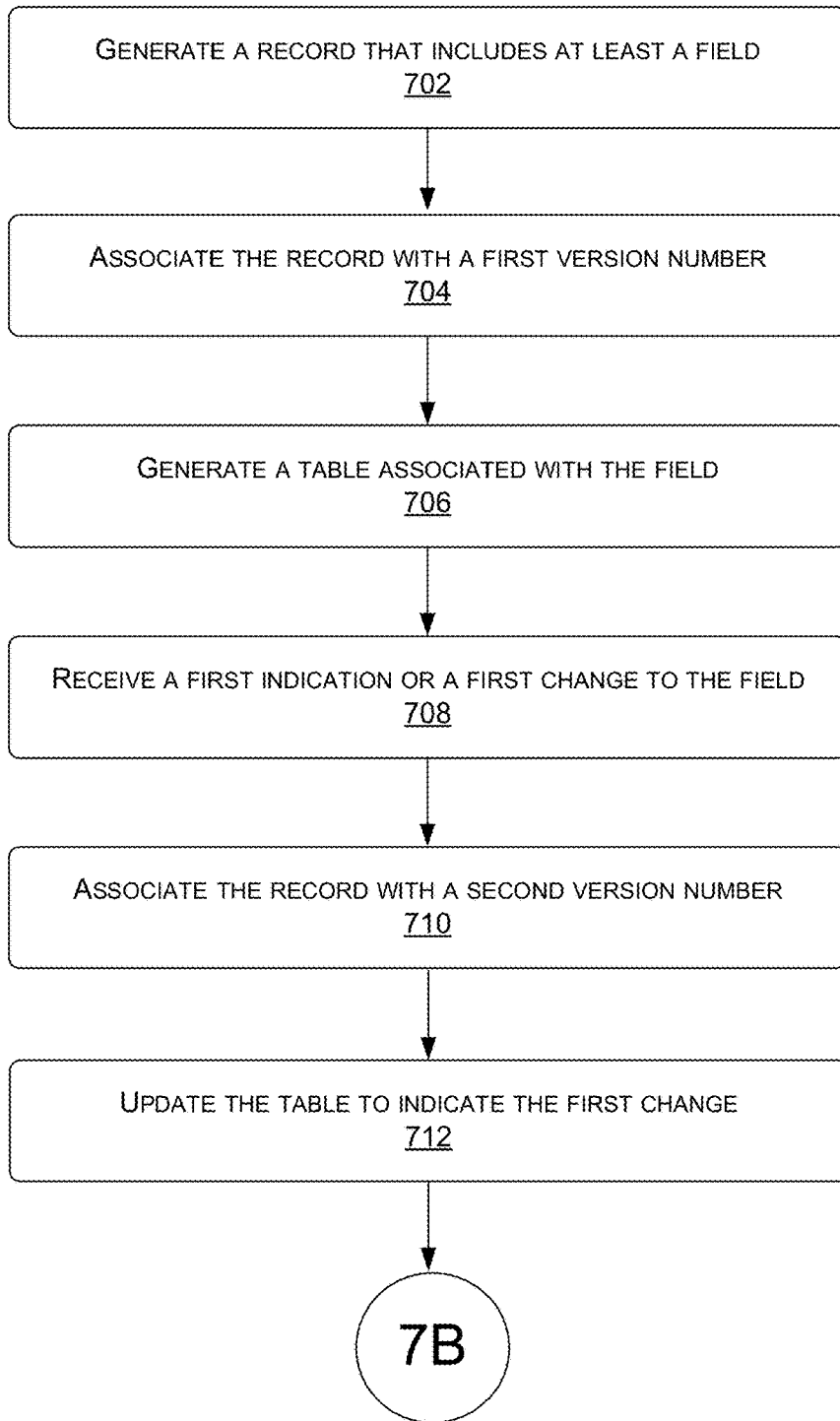
FIGS. 7A-7B illustrate a flow diagram of an example process for updating a table associated with a field of a record, according to various examples of the present disclosure.
Figure 7B:
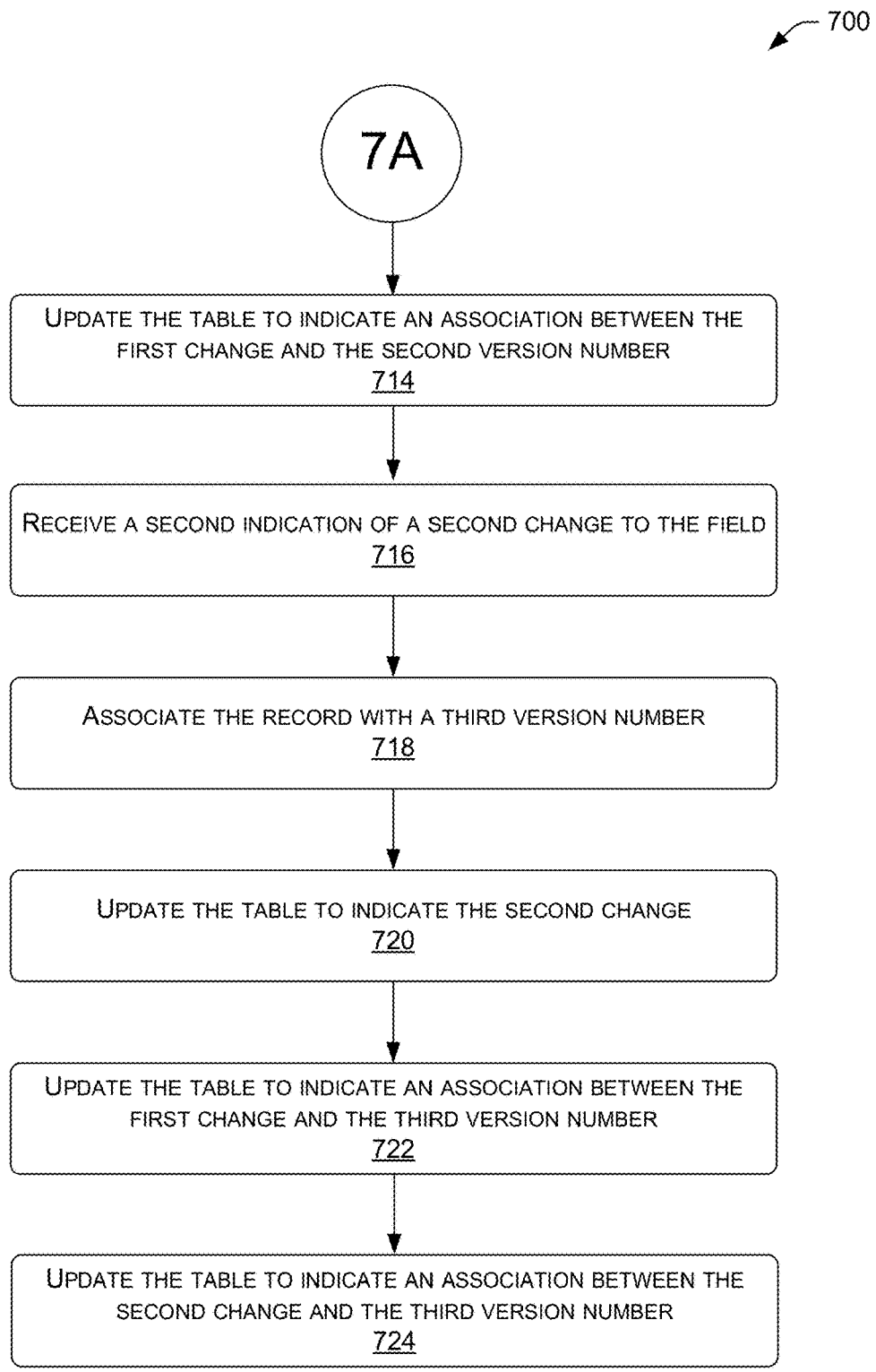

FIGS. 7A-7B illustrate a flow diagram of an example process 700 for updating a table associated with a field of a record, according to various examples of the present disclosure. Even though the example process 700 of FIGS. 7A-7B is described as being performed by the remote system 102, in other examples, at least some of the example process 700 of FIGS. 7A-7B may be performed by one or more other electronic devices. For example, at least some of the example process 700 of FIGS. 7A-7B may be performed by the electronic device 104, the one or more electronic devices 108, the electronic device 110, and/or the electronic device 202.

At block 702, the process 700 includes generating a record that includes at least a field. For example, the remote system 102 may generate a record that includes at least the field. In some examples, the remote system 102 generates the record based at least in part on receiving, from electronic device(s), data representing the record. The remote system 102 may then store the data in one or more databases.

At block 704, the process 700 includes associating the record with a first version number. For example, the remote system 102 may associate the record with the first version number. In some examples, the remote system 102 associates the record with the first version number based at least in part on generating the record. In some examples, the remote system 102 associates the record with the first version number based at least in part on receiving data representing initial information input into the record. In some examples, the remote system 102 associates the record with the first version number by storing, in association with the record, data representing the first version number.

At block 706, the process 700 includes generating a table associated with the field. For example, the remote system 102 may generate the table associated with the field of the record. In some examples, the remote system 102 identifies the field by analyzing the data associated with the record. In some examples, the remote system 102 identifies the field by receiving, from electronic device(s), data indicating that the record includes the field. Still, in some examples, the remote system 102 identifies the field by receiving, from the electronic device(s), data representing information input into the field.

At block 708, the process 700 includes receiving a first indication of a first change to the field. For example, the remote system 102 may receive, from the electronic device (s), data representing that the first change has occurred with the field. In some examples, the data may represent that information was added to the field of the record. In some examples, the data may represent that information that was included within the field was changed to new information.

At block 710, the process 700 includes associating the record with a second version number. For example, based at least in part on the record being updated and/or changed, the remote system 102 may associate the record with the second version number. In some examples, the remote system 102 may increment the first version number to create the second version number. For example, the first version number may include 1 and the second version number may include 2. In some examples, the remote system 102 associates the record with the second version number by storing, in association with the record, data representing the second version number.

At block 712, the process 700 includes updating the table to indicate the first change. For example, the remote system 102 may update the table to indicate the first change to the field. In some examples, the remote system 102 may further update the table to indicate a first time at which the first change occurred with the field, a first identity associated with a user that made the first change, and/or a reason for the first change.

At block 714, the process 700 includes updating the table to indicate an association between the first change and the second version number. For example, the remote system 102 may update the table to indicate the association between the first change and the second version number. In some examples, the association indicates that the first change occurred while the record was being updated from the first version of the record to the second version of the record.

At block 716, the process 700 includes receiving a second indication of a second change to the field. For example, the remote system 102 may receive, from the electronic device(s), data representing that the second change has occurred with the field. In some examples, the data may represent that information was added to the field of the record. In some examples, the data may represent that the information added during the first change has been changed to new information.

At block 718, the process 700 includes associating the record with a third version number. For example, based at least in part on the record being updated and/or changed, the remote system 102 may associate the record with the third version number. In some examples, the remote system 102 may increment the second version number to create the third version number. For example, the second version number may include 2 and the third version number may include 3. In some examples, the remote system 102 associates the record with the third version number by storing, in association with the record, data representing the third version number.

At block 720, the process 700 includes updating the table to indicate the second change. For example, the remote system 102 may update the table to indicate the second change to the field. In some examples, the remote system 102 may further update the table to indicate a second time at which the second change occurred with the field, a second identity associated with a user that made the second change, and/or a reason for the second change.

At block 722, the process 700 includes updating the table to indicate an association between the first change and the third version number. For example, the remote system 102 may update the table to indicate the association between the first change and the third version number. In some examples, the association indicates that previous information that was added to the field at the first change was included within the record between the second version of the record and the third version of the record.

At block 724, the process 700 includes updating the table to indicate an association between the second change and the third version number. For example, the remote system 102 may update the table to indicate the association between the second change and the third version number. In some examples, the association indicates that the second change occurred while the record was being updated from the second version of the record to the third version of the record.

Figure 8:
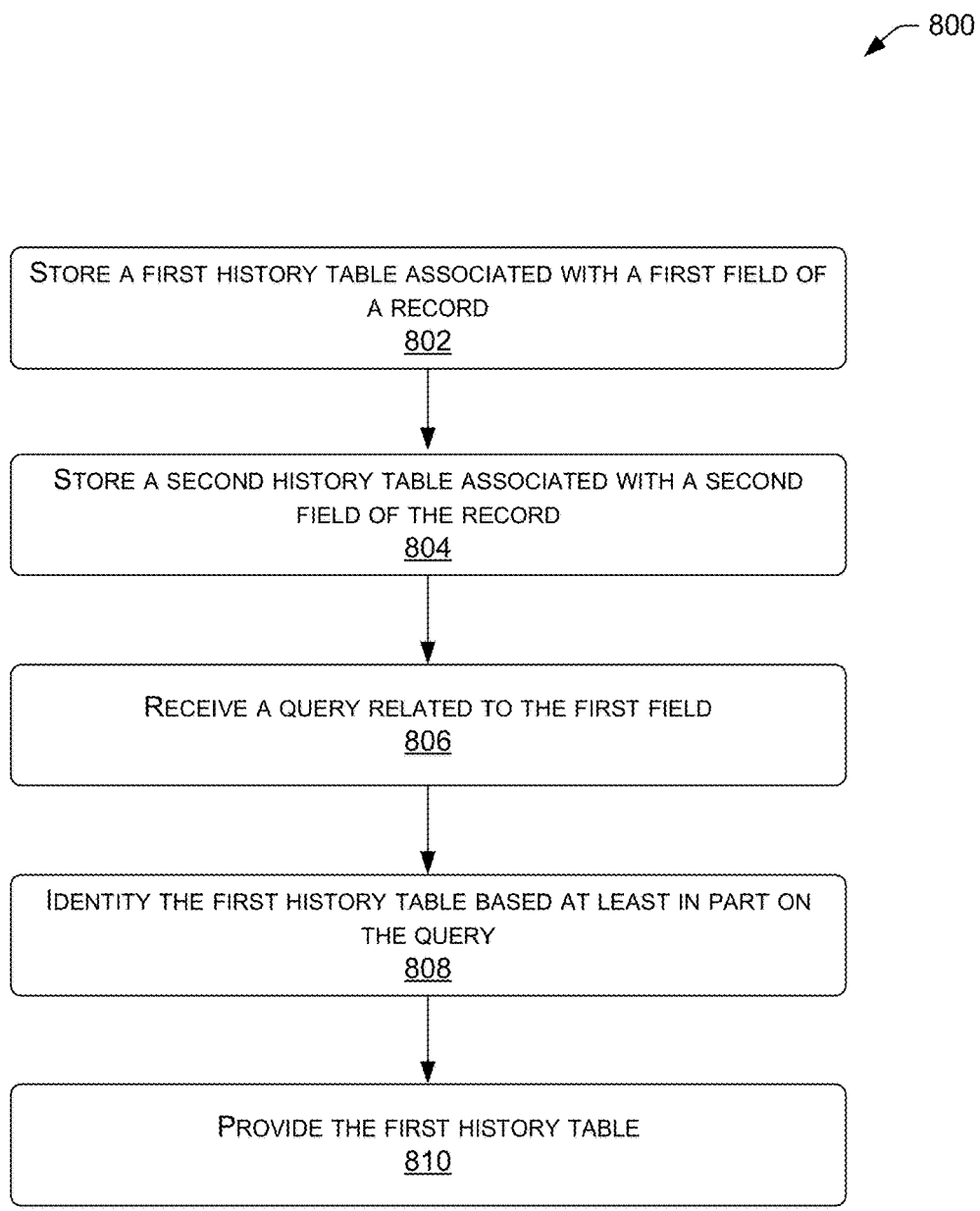
FIG. 8 illustrates a flow diagram of an example process for utilizing history tables to provide information related to a record, according to various examples of the present disclosure.

FIG. 8 illustrates a flow diagram of an example process 800 for utilizing history tables to provide information related to a record, according to various examples of the present disclosure. Even though the example process 800 of FIG. 8 is described as being performed by the remote system 102, in other examples, at least some of the example process 800 of FIG. 8 may be performed by one or more other electronic devices. For example, at least some of the example process 800 of FIG. 8 may be performed by the electronic device 104, the one or more electronic devices 108, the electronic device 110, and/or the electronic device 202.

At block 802, the process 800 includes storing a first history table associated with a first field of a record. For example, the remote system 102 may store the first history table associated with the first field of the record. The first history table may indicate updates and/or changes that occurred to information related to the first field. In some examples, the remote system 102 generated the first history table. In some examples, the remote system 102 updated the first history table based at least in part on the updates and/or the changes that occurred with the information related to the first field.

At block 804, the process 800 includes storing a second history table associated with a second field of the record. For example, the remote system 102 may store the second history table associated with the second field of the record. The second history table may indicate updates and/or changes that occurred to information related to the second field. In some examples, the remote system 102 generated the second history table. In some examples, the remote system 102 updated the second history table based at least in part on the updates and/or the changes that occurred with the information related to the second field.

At block 806, the process 800 includes receiving a query related to the first field. For example, the remote system 102 may receive the query related to the first field. In some examples, receiving the query may include the remote system 102 receiving, from the electronic device(s), data representing the query related to the first field. For example, the data may represent a first identifier associated with the record and/or a second identifier associated with the first field.

At block 808, the process 800 includes identifying the first history table based at least in part on the query. For example, the remote system 102 may identify the first history table based at least in part on the query. For example, if the data represents the first identifier associated with the record, the remote system 102 may identify the record using the first identifier. Additionally, if the data represents the second identifier associated with the first field, the remote system 102 may identify the first history table using the second identifier.

At block 810, the process 800 includes providing the first history table. For example, the remote system 102 may provide the first history table. In some examples, providing the first history table may include the remote system 102 sending, to the computing device(s), data representing the first history table. In such examples, the data may cause the electronic device(s) to display the table to a user.

Figure 9:
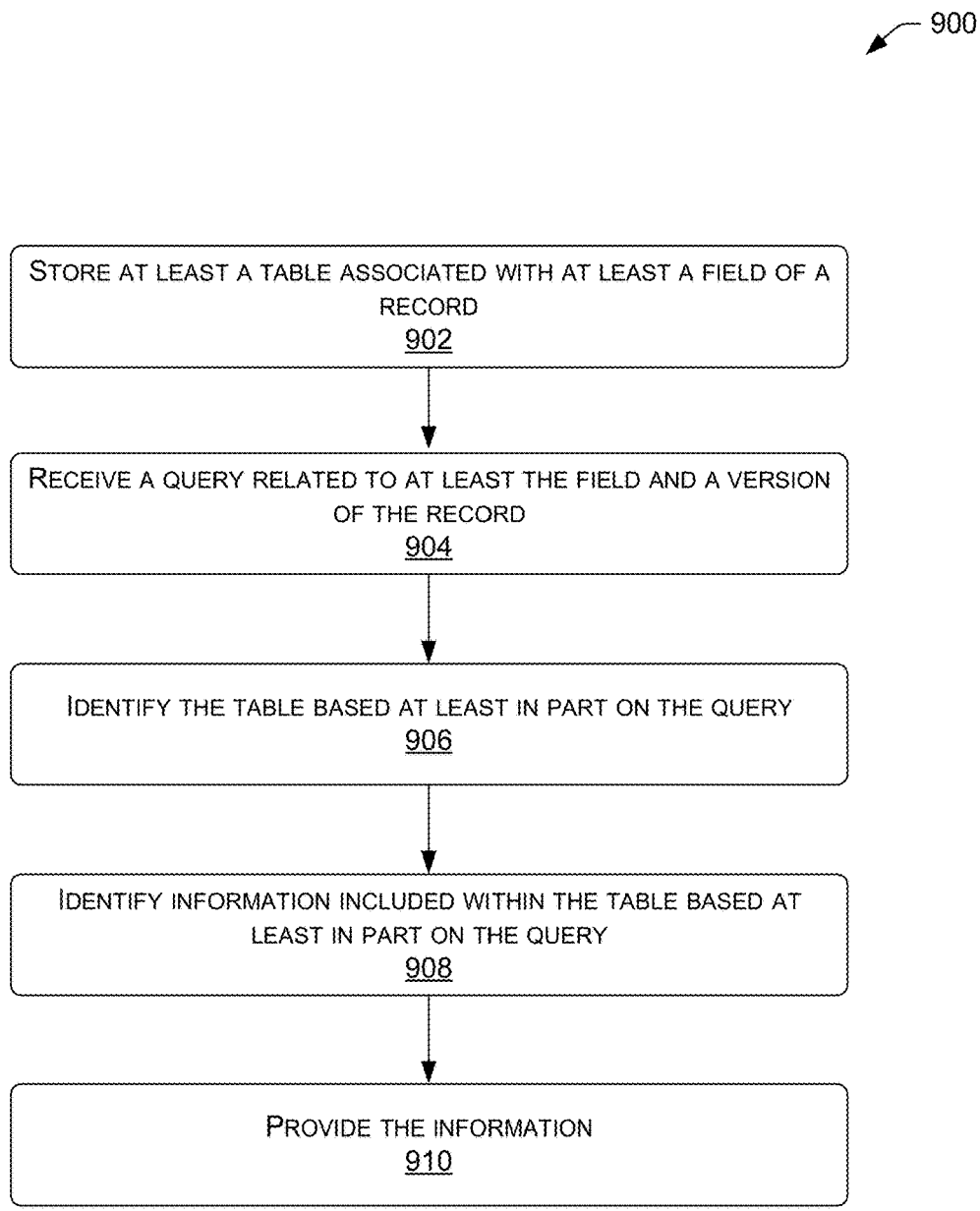
FIG. 9 illustrates a flow diagram of an example process for identifying information associated with a record using a table and a version number, according to various examples of the present disclosure.

FIG. 9 illustrates a flow diagram of an example process 900 for utilizing identifying information associated with a record using a table and a version number, according to various examples of the present disclosure. Even though the example process 900 of FIG. 9 is described as being performed by the remote system 102, in other examples, at least some of the example process 900 of FIG. 9 may be performed by one or more other electronic devices. For example, at least some of the example process 900 of FIG. 9 may be performed by the electronic device 104, the one or more electronic devices 108, the electronic device 110, and/or the electronic device 202.

At block 902, the process 900 includes storing at least a table associated with at least a field of a record. For example, the remote system 102 may store the table associated with the field of the record. The table may indicate updates and/or changes that occurred to information related to the field. In some examples, the remote system 102 generated the table. In some examples, the remote system 102 updated the table based at least in part on the updates and/or the changes that occurred with the information related to the field.

At block 904, the process 900 includes receiving a query related to at least the field and a version of the record. For example, the remote system 102 may receive the query related to the field and the version of the record. In some examples, receiving the query may include the remote system 102 receiving, from electronic device(s), data representing the query related to the field and the version of the record. For example, the data may represent a first identifier associated with the record, a second identifier associated with the field, and/or a third identifier associated with the version.

At block 906, the process 900 includes identifying the table based at least in part on the query. For example, the remote system 102 may identify the table based at least in part on the query. In some examples, such as when the data represents the first identifier associated with the record, the remote system 102 may use the first identifier to identify the record. Additionally, such as when the data represents the second identifier associated with the field, the remote system 102 may use the second identifier to identify the field and/or the table associated with the field.

At 908, the process 900 includes identifying information included within the table based at least in part on the query. For example, the remote system 102 may identify the information based at least in part on the query. In some examples, such as when the data represents the third identifier associated with the field, the remote system 102 may analyze the table using the version to identify the information. For example, the remote system 102 may identify one or more entries within the table that include one or more indications of the version. The information may include, but is not limited to, specific information related to the field during the version of the record, a time at which specific information related to the field was updated and/or changed, an identifier for a user that updated and/or changed the specific information related to field, a reason that the user updated and/or changed the specific information related to the field, and/or the like.

At 910, the process 900 includes providing the information. For example, the remote system 102 may provide the information. In some examples, providing the information may include the remote system 102 sending, to the electronic device(s), data representing the information. In such examples, the data may cause the electronic device(s) to display the information to a user.

Figure 10:
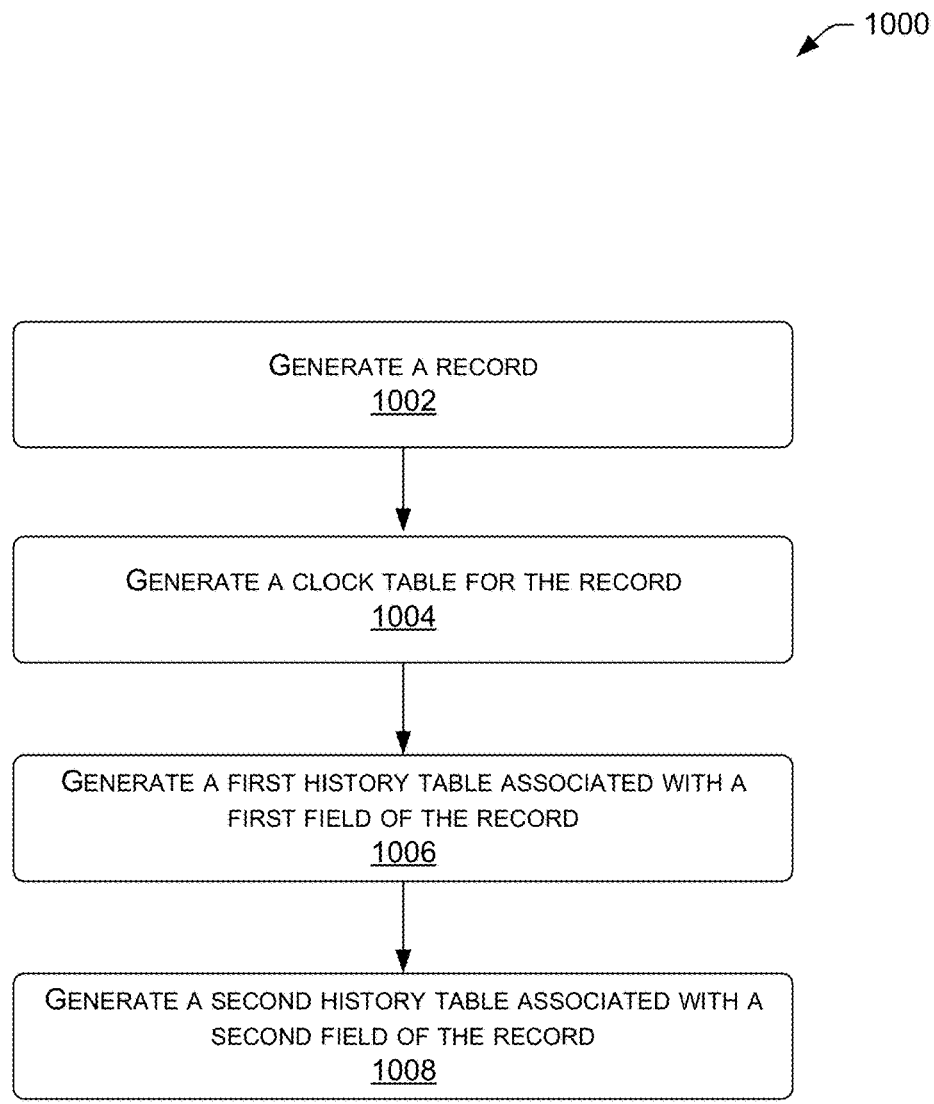
FIG. 10 illustrates a flow diagram of an example process for generating history tables for a record, according to various aspects of the present disclosure.

FIG. 10 illustrates a flow diagram of an example process 1000 for generating history tables for a record, according to various aspects of the present disclosure. Even though the example process 1000 of FIG. 10 is described as being performed by the remote system 102, in other examples, at least some of the example process 1000 of FIG. 10 may be performed by one or more other electronic devices. For example, at least some of the example process 1000 of FIG. 10 may be performed by the electronic device 104, the one or more electronic devices 108, the electronic device 110, and/or the electronic device 202.

At block 1002, the process 1000 includes generating a record. For example, the remote system 102 may generate a record associated with an event. In some examples, the remote system 102 generates the record based at least in part on receiving, from electronic device(s), data associated with the record. The remote system 102 may then store the data in a database.

At block 1004, the process 1000 includes generating a clock table for the record. For example, the remote system 102 may generate the clock table for the record. In some examples, the clock table may include version number indicating when the record (e.g., one or more fields of the record) are updated. Additionally, or alternatively, in some examples, the clock table may include timestamps indicating when the record (e.g., the one or more fields of the record) are updated).

At block 1006, the process 1000 includes generating a first history table associated with a first field of the record. For example, the remote system 102 may generate the first history table associated with the first field of the record. In some examples, the remote system 102 identifies the first field by analyzing the record. In some examples, the remote system 102 identifies the first field by receiving, from the electronic device(s), data indicating that the record includes the first field. Still, in some examples, the remote system 102 identifies the first field by receiving, from the electronic device(s), data representing information input into the first field.

At block 1008, the process 1000 includes generating a second history table associated with a second field of the record. For example, the remote system 102 may generate the second history table associated with the second field of the record. In some examples, the remote system 102 identifies the second field by analyzing the record. In some examples, the remote system 102 identifies the second field by receiving, from electronic device(s), data indicating that the record includes the second field. Still, in some examples, the remote system 102 identifies the second field by receiving, from the electronic device(s), data representing information input into the second field.

Figure 11:
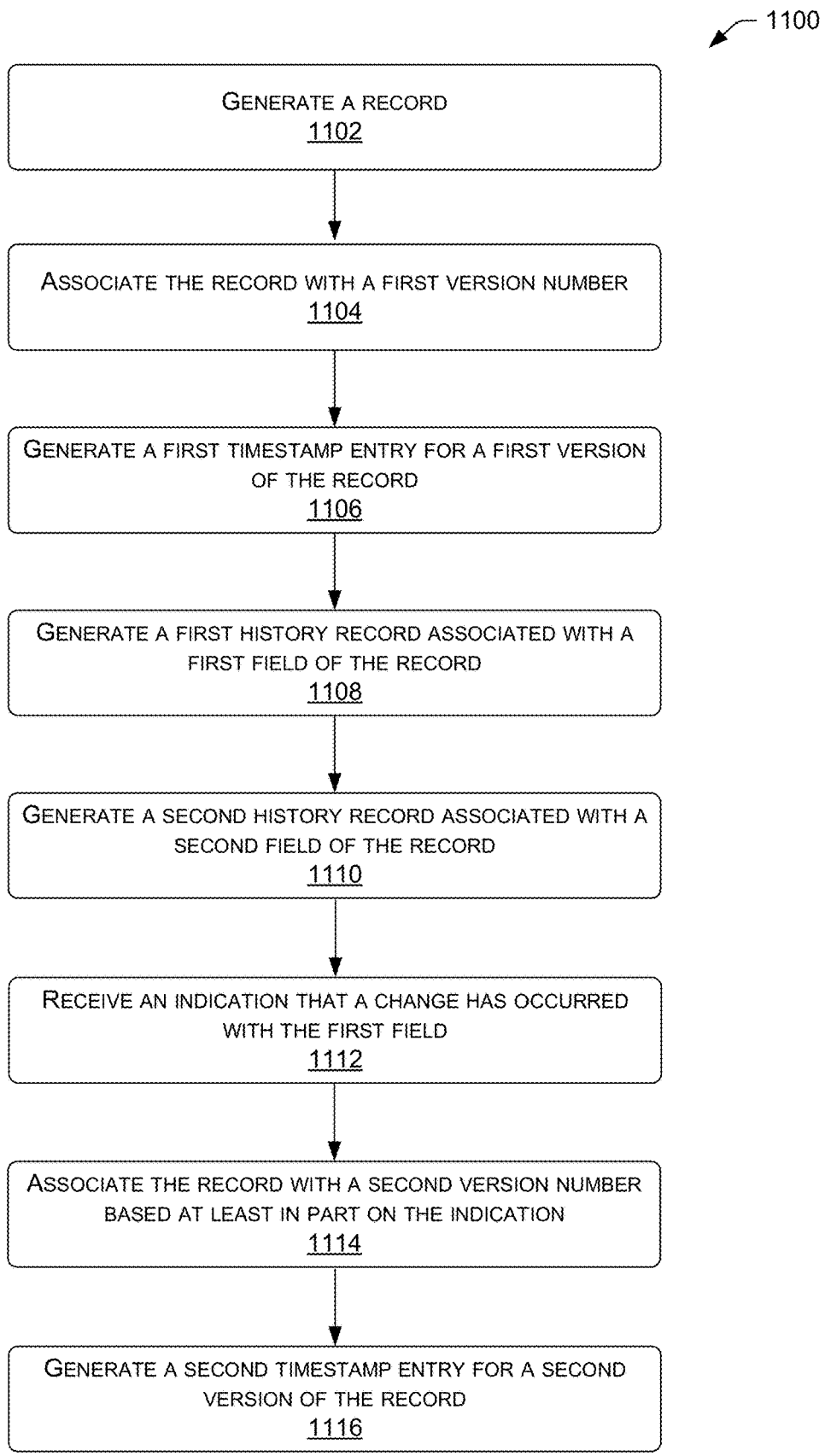
FIG. 11 illustrates a flow diagram of an example process for updating history tables of a record, according to various aspects of the present disclosure.

FIG. 11 illustrates a flow diagram of an example process 1100 for updating history tables of a record, according to various aspects of the present disclosure. Even though the example process 1100 of FIG. 11 is described as being performed by the remote system 102, in other examples, at least some of the example process 1100 of FIG. 11 may be performed by one or more other electronic devices. For example, at least some of the example process 1100 of FIG. 11 may be performed by the electronic device 104, the one or more electronic devices 108, the electronic device 110, and/or the electronic device 202.

At block 1102, the process 1100 includes generating a record. For example, the remote system 102 may generate a record associated with an event. In some examples, the remote system 102 generates the record based at least in part on receiving, from electronic device(s), data associated with the record. The remote system 102 may then store the data in a database. In some examples, the remote system 102 further associates the record with a clock table.

At block 1104, the process 1100 includes associating the record with a first version number. For example, the remote system 102 may associate the record with the first version number. In some examples, the remote system 102 associates the record with the first version number based at least in part on generating the record. In some examples, the remote system 102 associates the record with the first version number based at least in part on receiving data representing initial information input into the record. In some examples, the remote system 102 associates the record with the first version number by storing, in association with the record, data representing the first version number. In some examples, the remote system 102 may update the clock table to indicate the first version number.

At block 1106, the process 1100 includes generating a first timestamp entry for a first version of the record. For example, the remote system 102 may generate the first timestamp entry for the first version of the record. In some examples, the first timestamp entry may indicate a time at which the record was generated. The time may include, but is not limited to, the time of the day, the time of the week, the time of the year, and/or the like. In some examples, the remote system 102 updates the clock table with the first timestamp entry.

At block 1108, the process 1100 includes generating a first history record associated with a first field of the record. For example, the remote system 102 may generate the first history record associated with the first field of the record. The first history record may be associated with, and/or utilized to generate, a first history table for the first entry. In some examples, the remote system 102 identifies the first field by analyzing the record. In some examples, the remote system 102 identifies the first field by receiving, from the electronic device(s), data indicating that the record includes the first field. Still, in some examples, the remote system 102 identifies the first field by receiving, from the electronic device(s), data representing information input into the first field.

At block 1110, the process 1100 includes generating a second history record associated with a second field of the record. For example, the remote system 102 may generate the second history record associated with the second field of the record. In some examples, the second history record may be associated with, and/or utilized to generate, a second history table for the second entry. In some examples, the remote system 102 identifies the second field by analyzing the record. In some examples, the remote system 102 identifies the second field by receiving, from electronic device(s), data indicating that the record includes the second field. Still, in some examples, the remote system 102 identifies the second field by receiving, from the electronic device(s), data representing information input into the second field.

At block 1112, the process 1100 includes receiving an indication that a change has occurred with the first field. For example, the remote system 102 may receive, from the electronic device(s), data representing that the change has occurred with the first field. In some examples, the data may represent that information was added to the first field of the record. In some examples, the data may represent that information that was included within the first field was changed to new information.

At block 1114, the process 1100 includes associating the record with a second version number based at least in part on the indication. For example, based at least in part on the record being updated and/or changed, the remote system 102 may associate the record with the second version number. In some examples, the remote system 102 may increment the first version number to create the second version number. For example, the first version number may include 1 and the second version number may include 2. In some examples, the remote system 102 associates the record with the second version number by storing, in association with the record, data representing the second version number. In some examples, the remote system 102 associates the record with the second version number by updating the clock table with the second version number.

At 1116, the process 1100 includes generating a second timestamp entry for a second version of the record. For example, the remote system 102 may generate the second timestamp entry for the second version of the record. In some examples, the second timestamp entry may indicate a time at which the record was updated to the second version. In some examples, the remote system 102 updates the clock table with the second timestamp entry.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   one or more non-transitory computer-readable media storing instructions that, when executed by the one or more processors, cause the system to perform operations comprising:
   storing, in a database, a record associated with a patient, the record including a first field and a second field;
   associating the record with a first version number;
   associating, in a first history table associated with the first field of the record, the first field with the first version number;

associating, in a second history table associated with the second field of the record, the second field with the first version number;

determining that a first change in the record has occurred with respect to the second field; and based at least in part on the first change:
associating the record with a second version number,
updating the first history table to indicate that the first field of the record is associated with a range of version numbers including the first version number and the second version number, the range of version numbers indicating that the first field of the record was unaffected by the first change in the record, and
updating the second history table to indicate the first change that occurred with respect to the second field and that the first change is associated with the second version number.

2. The system of claim 1, the operations further comprising:
receiving, from an electronic device, a query associated with changes that have been made to the first field of the record; and
based at least in part on the query, sending, to the electronic device, data representing the first history table.

3. The system of claim 1, the operations further comprising:
determining that a second change in the record has occurred with respect to the first field;
based at least in part on the second change:
associating the record with a third version number;
updating the first history table to indicate at least the second change in the record that occurred with respect to the first field and that the second change is associated with the third version number; and
updating the second history table to indicate at least that the first change in the record that occurred with respect to the second field is associated with a range of version numbers including the second version number and the third version number.

4. The system of claim 1, wherein the record is a medical record associated with the patient, the first field of the record includes first medical information associated with the patient, and the second field of the record includes second medical information associated with the patient.

5. The system of claim 1, the operations further comprising:
associating the record with a first timestamp, the first timestamp indicating a first time at which an original version of the record was generated; and
based at least in part on the first change, associating the first change in the record with a second timestamp, the second timestamp indicating a second time at which the first change occurred.

6. The system of claim 1, the operations further comprising storing an indication of an identity of a person who at least one of made or authorized the first change with respect to the second field of the record.

7. The system of claim 1, the operations further comprising storing an indication of a reason for the first change with respect to the second field of the record.

8. A method comprising:
associating a first version number with a record that is stored in a database, the record including a first field and a second field;
associating, in a first history table associated with the first field of the record, the first field with the first version number;
associating, in a second history table associated with the second field of the record, the second field with the first version number;
determining that a first change in the record has occurred with respect to the second field; and
based at least in part on the first change:
associating the record with a second version number,
updating the first history table to indicate that the first field of the record is associated with a range of version numbers including the first version number and the second version number, the range of version numbers indicating that the first field of the record was unaffected by the first change in the record, and
updating the second history table to indicate the first change that occurred with respect to the second field and that the first change is associated with the second version number.

9. The method of claim 8, further comprising:
receiving, from an electronic device, a query associated with changes that have been made to the first field of the record; and
based at least in part on the query, sending, to the electronic device, data representing the first history table.

10. The method of claim 8, further comprising:
determining that a second change in the record has occurred with respect to the first field; and
based at least in part on the second change:
associating the record with a third version number;
updating the first history table to indicate at least the second change in the record that occurred with respect to the first field and that the second change is associated with the third version number; and
updating the second history table to indicate at least that the first change in the record that occurred with respect to the second field is associated with a range of version numbers including the second version number and the third version number.

11. The method of claim 8, wherein the record is a medical record associated with a patient, the first field of the record includes first medical information associated with the patient, and the second field of the record includes second medical information associated with the patient.

12. The method of claim 8, further comprising:
associating the record with a first timestamp, the first timestamp indicating a first time at which an original version of the record was generated; and
based at least in part on the first change, associating the first change in the record with a second timestamp, the second timestamp indicating a second time at which the first change occurred.

13. The method of claim 8, further comprising storing an indication of an identity of a person who at least one of made or authorized the first change with respect to the second field of the record.

14. The method of claim 8, further comprising storing an indication of a reason for the first change with respect to the second field of the record.

15. One or more non-transitory computer-readable media storing instructions that, when executed, cause one or more computing devices to perform operations comprising:
associating a first version number with a record that is stored in a database, the record including a first field and a second field;

associating, in a first history table associated with the first field of the record, the first field with the first version number;

associating, in a second history table associated with the second field of the record, the second field with the first version number;

determining that a first change in the record has occurred with respect to the second field; and based at least in part on the first change:
associating the record with a second version number, updating the first history table to indicate that the first field of the record is associated with a range of version numbers including the first version number and the second version number, the range of version numbers indicating that the first field of the record was unaffected by the first change in the record, and updating the second history table to indicate the first change that occurred with respect to the second field and that the first change is associated with the second version number.

16. The one or more non-transitory computer-readable media of claim 15, wherein the record is a medical record associated with a patient, the first field of the record includes first medical information associated with the patient, and the second field of the record includes second medical information associated with the patient.

17. The one or more non-transitory computer-readable media of claim 15, the operations further comprising:
associating the record with a first timestamp, the first timestamp indicating a first time at which an original version of the record was generated; and
based at least in part on the first change, associating the first change in the record with a second timestamp, the second timestamp indicating a second time at which the first change occurred.

18. The one or more non-transitory computer-readable media of claim 15, the operations further comprising:
storing a first indication of an identity of a person who at least one of made or authorized the first change with respect to the second field of the record; and
storing a second indication of a reason, provided by the person, for the first change with respect to the second field of the record.

* * * * *